US005335757A

United States Patent [19]

Knecht et al.

[11] Patent Number: 5,335,757
[45] Date of Patent: Aug. 9, 1994

[54] HYDRAULIC ADJUSTABLE VIBRATION DAMPER

[75] Inventors: Heinz Knecht; Hubert Beck, both of Eitorf, Fed. Rep. of Germany

[73] Assignee: Boge AG, Eitorf, Fed. Rep. of Germany

[21] Appl. No.: 971,483

[22] Filed: Nov. 4, 1992

[30] Foreign Application Priority Data

Nov. 13, 1991 [DE] Fed. Rep. of Germany ....... 4137330

[51] Int. Cl.$^5$ ............................................. F16F 9/46
[52] U.S. Cl. ..................................... 188/299; 188/318; 188/322.13; 188/322.19
[58] Field of Search .............. 188/299, 313, 314, 315, 188/316, 317, 318, 322.13, 322.14; 280/707, 714

[56] References Cited

U.S. PATENT DOCUMENTS

| 4,802,561 | 2/1989 | Knecht et al. | 188/299 |
| 5,163,706 | 11/1992 | Maguran, Jr. et al. | 188/299 |

FOREIGN PATENT DOCUMENTS

| 3434877 | 4/1986 | Fed. Rep. of Germany . |
| 3939012 | 5/1991 | Fed. Rep. of Germany . |
| 9110077 | 7/1991 | World Int. Prop. O. ........... 188/299 |

Primary Examiner—Matthew C. Graham
Assistant Examiner—Lee W. Young
Attorney, Agent, or Firm—Nils H. Ljungman & Associates

[57] ABSTRACT

Hydraulic adjustable vibration damper with a work cylinder, a piston fastened to a piston rod and dividing the work cylinder into two work chambers, at least one additional tube coaxially surrounding the work cylinder and at least one controllable damping valve installed in a stationary and sealed manner on the side of the vibration damper. For the proper and easy installation of the damping valve on the outer tube of the vibration damper, the damping valve is centered and held in a sealed manner by a centering ring in a hole in the tube, whereby the fastening is achieved by means of a screw fitting running through the hole of the centering ring.

9 Claims, 15 Drawing Sheets

FIG. 5A
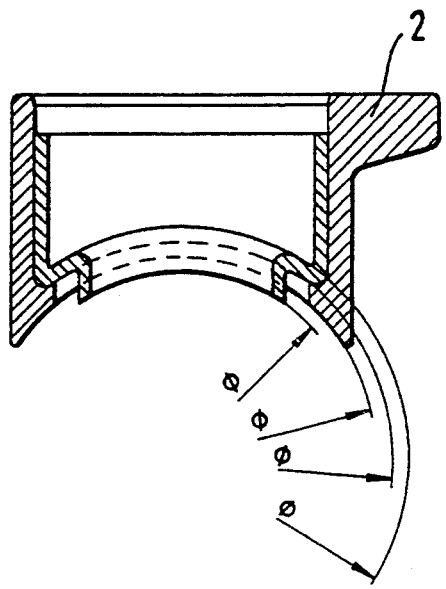
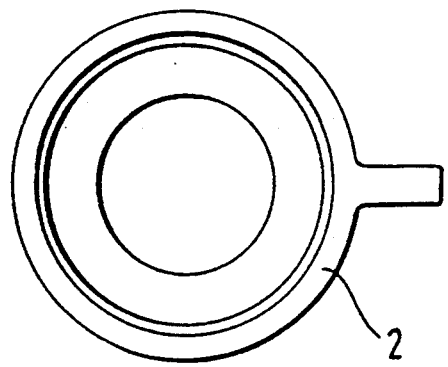
FIG. 5B

FIG. 6A
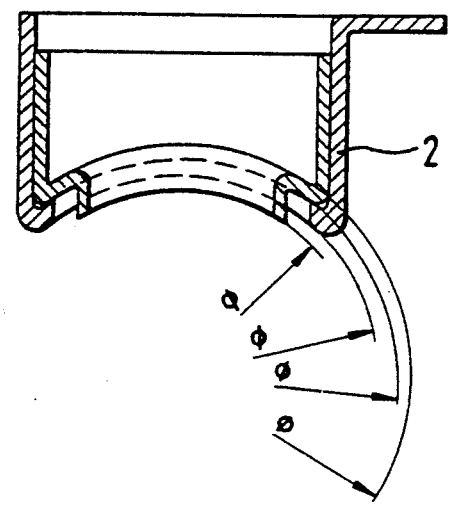
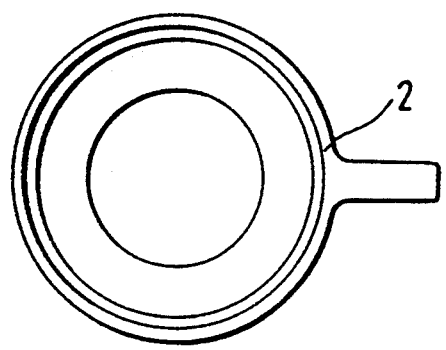
FIG. 6B

HYDRAULIC ADJUSTABLE VIBRATION DAMPER

BACKGROUND OF THE INVENTION

1. Field of the Invention

This invention relates to a hydraulic adjustable vibration damper with a work cylinder, a piston fastened to a piston rod and dividing the work cylinder into two work chambers, at least one additional tube coaxially surrounding the work cylinder and at least one controllable damping valve installed in a stationary and sealed manner on the side of the vibration damper.

2. Background Information

Hydraulic adjustable vibration dampers that may be known include the vibration damper described in U.S. Pat. No. 4,650,042, entitled Hydraulic Adjustable Shock Absorber, which corresponds to Federal Republic of Germany Patent No. 34 34 877, in which the work piston fastened to a piston rod divides the work cylinder into two work chambers, and in which there is at least one controllable damping valve located laterally on the vibration damper. To form a bypass and for the flow past the controllable damping valve, there is an additional tube outside the work cylinder but inside the jacket tube forming the equalization cheer. The mechanical and electrical parts of the controllable damping valve are held in a base welded onto the jacket tube. Such a lateral welded connection of the base is problematic not only from the fabrication point of view in that it may result in delays, but also in that it is expensive.

Vibration dampers for motor vehicles may be known (e.g. Federal Republic of Germany Patent No. 39 39 012) in which the work cylinder is coaxially surrounded by at least one additional chamber, and in which the inside and outside walls of at least one chamber are formed as a single piece and are connected to one another by means of webs running axially.

The chamber located between the inside and outside wall is divided in the longitudinal direction so that at least two separate chambers are formed, and so that outside, on the outside wall, there is at least one flat area. This flat area for a possible valve connection extends over the entire length of the tube, so that parts surrounding the tube, such as collars, spring plates, brackets, etc. must be provided with a corresponding inner contour, or the flat area must be machined by cutting in the vicinity of collars or brackets, so that the tube retains a cylindrical contour.

OBJECT OF THE INVENTION

The object of the invention is to modify the standard components of a conventional vibration damper so that a controllable damping valve can be installed laterally on vibration dampers using standard components of a conventional vibration damper and with a minimum of fabrication expense.

SUMMARY OF THE INVENTION

To achieve this object, the invention proposes that the damping valve be centered by means of a centering ring in a hole of the tube and be held in a sealed manner, and that the fastening be accomplished by means of a screw fitting which runs through the hole of the centering ring.

An advantage of this configuration is that conventional vibration dampers manufactured from steel tubes can be easily equipped with a controllable damping valve. It is possible, for example, to take a complete outer tube manufactured for a conventional application (outer tube with add-on pieces, collars, brackets, etc.) from the standard manufacturing process, and to process it for the installation of a controllable damping valve located on the side. An additional advantage is that as a result of the fastening by means of the screw fitting running through the centering ring, an excellent seal can be achieved, which is guaranteed by the centric threaded connection.

In accordance with an additional essential feature, the centering ring has an extension which is engaged in the hole of the tube. In this configuration there can be a groove, radially outside the extension, to hold a gasket which forms a seal against the outer jacket surface of the tube.

According to an additional particularly advantageous embodiment, the centering ring is secured against twisting in a form-fitting manner with the housing of the damping valve. The form-fitting connection can be advantageously achieved by providing at least one recess on the circumference of the centering ring, in which a corresponding projection of the housing is engaged.

In one configuration of the invention, the housing is a magnetic cap with the electrical parts, which covers the mechanical valve parts and is connected in a stationary and sealed manner to the centering ring. In other configurations of the invention, the damping valve may be controlled hydraulically, or by some other non-electrical means.

A variant which is particularly simple from a manufacturing point of view has an element manufactured without cutting as the centering ring, or the centering ring can be a compound structure comprising at least two parts.

A correct screw fitting of the damping valve is achieved by having the screw fitting in one of the tubes. The tube is therefore advantageously equipped with a threaded ring.

One aspect of the invention resides broadly in a vibration damper for a motor vehicle, the vibration damper comprising: a first tube having a first end, a second end, a side and a hole; a work cylinder disposed within the first tube; a first chamber and a second chamber disposed within the work cylinder; a piston assembly comprising a piston rod and a piston connected to the piston rod, the piston assembly being disposed within the work cylinder, the piston rod extending past the first end of the first tube, and the piston separating the first chamber from the second chamber; a first end piece attached to the first end of the first tube, the first end piece having a hole, and the piston rod running through the hole in the first end piece; a second end piece rigidly connected to the second end of the first tube; a controllable valve for bypassing damping fluid between the first chamber and the second chamber, the controllable valve comprising a valve body, which valve body has a first screw fitting; a second screw fitting disposed within the first tube, the second screw fitting threadedly engaging the first screw fitting; and a centering ring disposed in the hole in the first tube, the centering ring being disposed about the controllable valve, the centering ring being sealed against the first tube, the centering ring stiffening the controllable valve against angular movement, the controllable valve being sealed against the centering ring, and the centering ring having a hole.

Another aspect of the invention resides broadly in a vibration damper for a motor vehicle made by the following method of assembling the vibration damper: providing a piston and a piston rod; assembling a piston assembly comprising the piston and the piston rod, which assembling comprises connecting the piston to the piston rod; providing a work cylinder; inserting the piston assembly into the work cylinder; providing a first tube having a first end, a second end, a side and a hole; inserting the piston assembly and the work cylinder into the first tube; providing a second screw fitting; attaching the second screw fitting to a portion of the vibration damper for being disposed within the first tube; aligning the second screw fitting with the hole in the first tube; providing a first end piece having a hole; fastening the first end piece to the first end of the first tube; providing a second end piece; rigidly connecting the second end piece to the second end of the first tube; providing a centering ring having a hole; inserting the centering ring into the hole in the first tube; providing a controllable valve for bypassing damping fluid between the first chamber and the second chamber, the controllable valve comprising a valve body, which valve body has a first screw fitting; aligning the first screw fitting with the second screw fitting; screwing the first screw fitting into the second screw fitting; disposing the connecting ring about the valve; and screwing a portion of the valve while assembling the vibration damper, and thus: sealing the valve against the centering ring, resulting in a seal between the valve and the centering ring in the assembled vibration damper; sealing the centering ring against the first tube, resulting in a seal between the centering ring and the first tube in the assembled vibration damper; and at least when the screwing is completed, stiffening the controllable valve against angular movement with the centering ring; to produce a vibration damper comprising: the first tube; the work cylinder disposed within the first tube; the first chamber and the second chamber disposed within the work cylinder; the piston assembly comprising the piston rod and the piston, the piston being connected to the piston rod, the piston assembly being disposed within the work cylinder, the piston rod extending past the first end of the first tube, and the piston separating the first chamber from the second chamber; the first end piece attached to the first end of the first tube, the piston rod running through the hole in the first end piece; the second end piece rigidly connected to the second end of the first tube; the controllable valve for bypassing damping fluid between the first cheer and the second chamber; the second screw fitting disposed within the first tube, the second screw fitting threadedly engaging the first screw fitting; and the centering ring disposed in the hole in the first tube, the centering ring being disposed about the controllable valve, the centering ring being sealed against the first tube, the centering ring stiffening the controllable valve against angular movement, and the controllable valve being sealed against the centering ring.

Yet another aspect of the invention resides broadly in a method for producing a vibration damper for a motor vehicle, the vibration damper comprising: a first tube having a first end, a second end, a side and a hole; a work cylinder disposed within the first tube; a first chamber and a second chamber disposed within the work cylinder; a piston assembly comprising a piston rod and a piston connected to the piston rod, the piston assembly being disposed within the work cylinder, the piston rod extending past the first end of the first tube, and the piston separating the first chamber from the second chamber; a first end piece attached to the first end of the first tube, the first end piece having a hole, and the piston rod running through the hole in the first end piece; a second end piece rigidly connected to the second end of the first tube; a controllable valve for bypassing damping fluid between the first chamber and the second chamber, the controllable valve having a valve body with a first screw fitting; a second screw fitting disposed within the first tube, the second screw fitting threadedly engaging the first screw fitting; and a centering ring disposed in the hole in the first tube, the centering ring being disposed about the controllable valve, the centering ring being sealed against the first tube, the centering ring stiffening the controllable valve against angular movement, the controllable valve being sealed against the centering ring, and the centering ring having a hole; the method comprising the following steps of assembling the vibration damper by: providing a piston and a piston rod; assembling a piston assembly comprising the piston and the piston rod, which assembling comprises connecting the piston to the piston rod; providing a work cylinder; inserting the piston assembly into the work cylinder; providing a first tube having a first end, a second end, a side and a hole; inserting the piston assembly and the work cylinder into the first tube; providing a second screw fitting; attaching the second screw fitting to a portion of the vibration damper for being disposed within the first tube; aligning the second screw fitting with the hole in the first tube; providing a first end piece having a hole; fastening the first end piece to the first end of the first tube; providing a second end piece; rigidly connecting the second end piece to the second end of the first tube; providing a centering ring having a hole; inserting the centering ring into the hole in the first tube; providing a controllable valve for bypassing damping fluid between the first chamber and the second chamber, the controllable valve comprising a valve body, which valve body has a first screw fitting; aligning the first screw fitting with the second screw fitting; screwing the first screw fitting into the second screw fitting; disposing the connecting ring about the valve; and screwing a portion of the valve while assembling the vibration damper, and thus: sealing the valve against the centering ring, resulting in a seal between the valve and the centering ring in the assembled vibration damper; sealing the centering ring against the first tube, resulting in a seal between the centering ring and the first tube in the assembled vibration damper; and at least when the screwing is completed, stiffening the controllable valve against angular movement with the centering ring.

BRIEF DESCRIPTION OF THE DRAWINGS

Preferred embodiments of the invention are illustrated schematically in the accompanying drawings.

FIGS. 5A and 5B show a centering ring which is a compound structure.

FIGS. 6A and 6B show an additional embodiment of a centering ring which is a compound structure.

DESCRIPTION OF THE PREFERRED EMBODIMENTS

Figure 1:
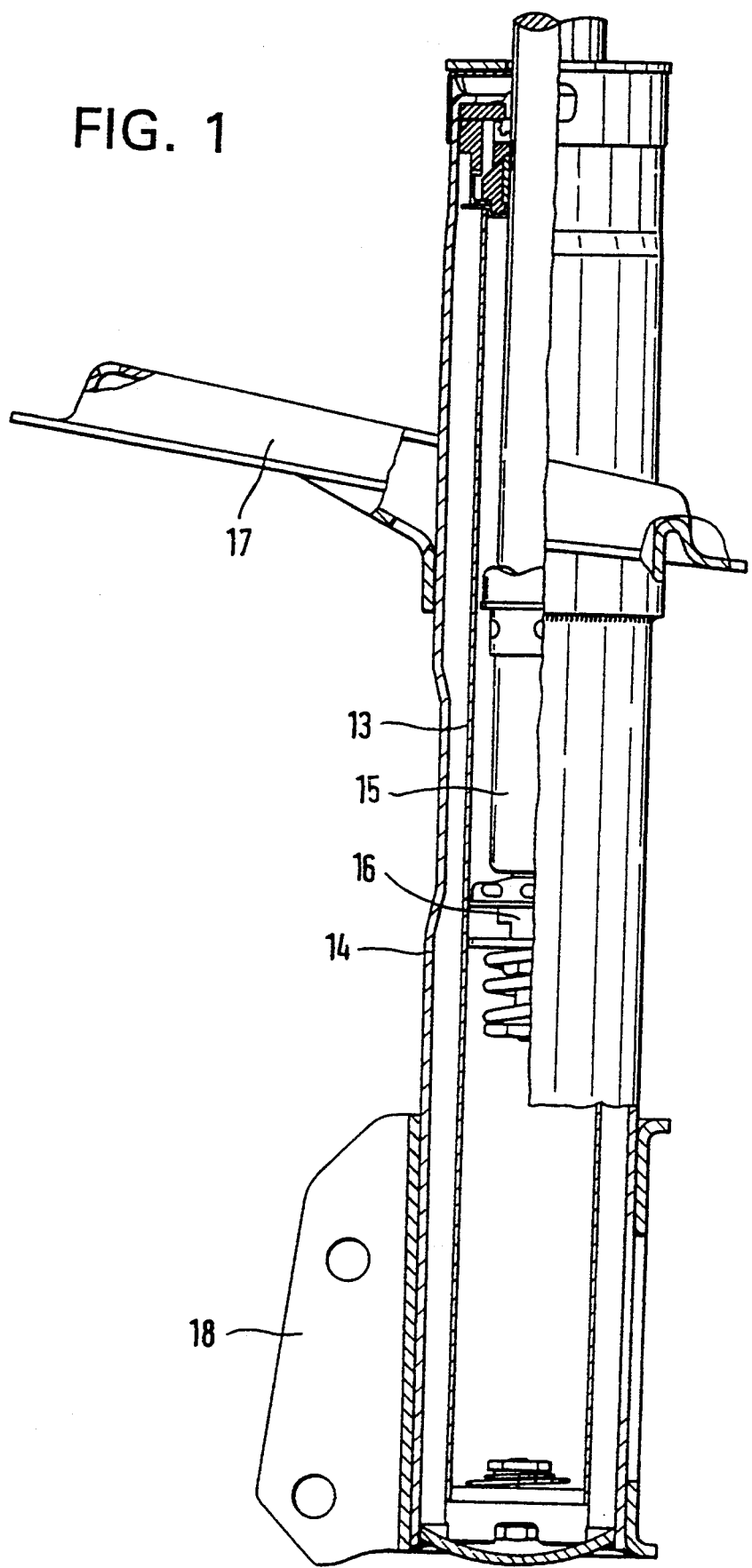
FIG. 1 shows a conventional vibration damper.

The vibration damper illustrated in FIG. 1 is a conventional vibration damper wherein the work cylinder 13 is equipped with a jacket tube 14 to form an equalization chamber. The damping piston 16 fastened to the piston rod 15 divides the work cylinder 13 into two work chambers. A collar 17 and a bracket 18 are attached to the jacket tube 14 for mounting the vibration damper on a vehicle.

Figure 2:
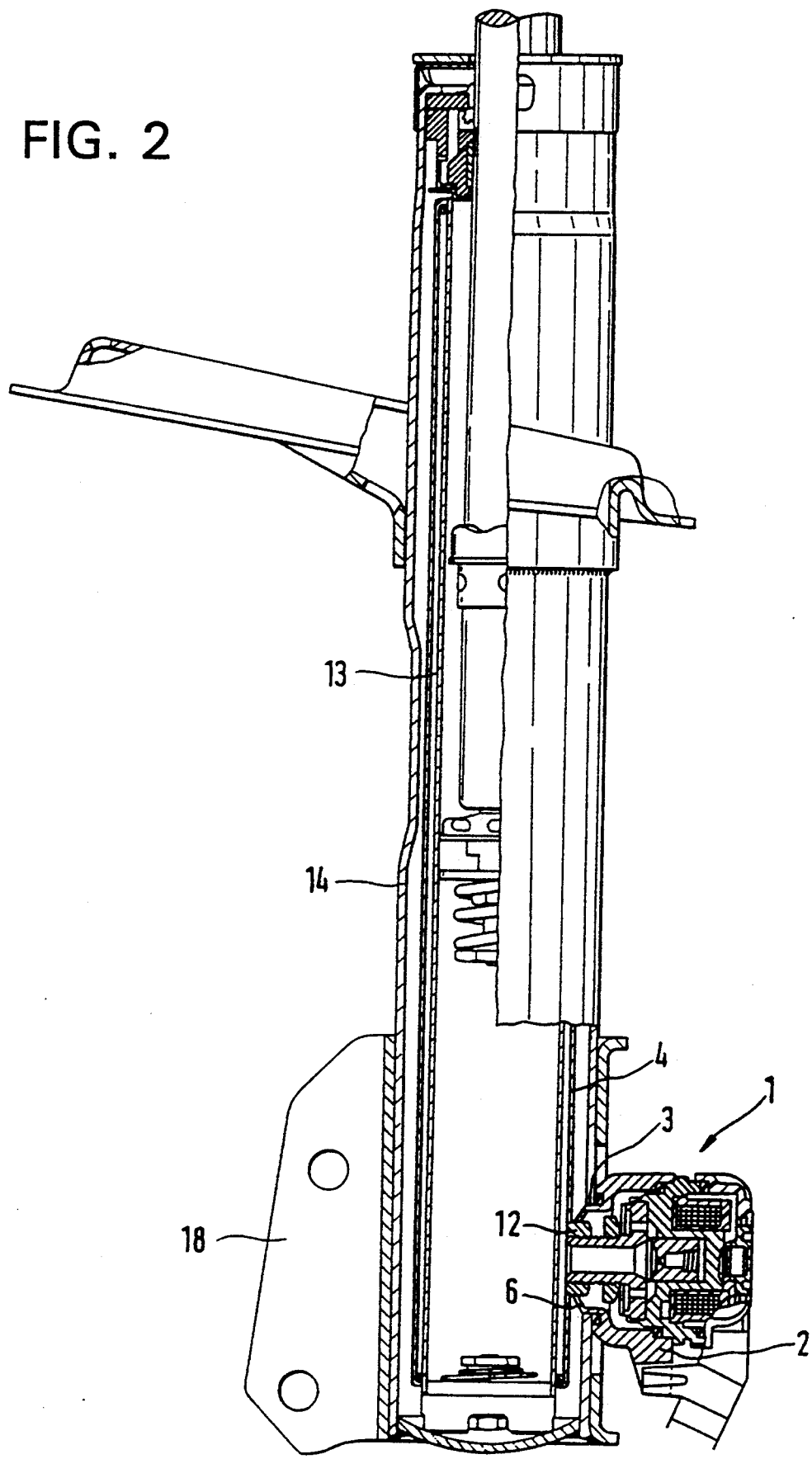
FIG. 2 shows a vibration damper similar to the one illustrated in FIG. 1, with a damping valve located on the side.

FIG. 2, which is based on a conventional vibration damper like the one illustrated in FIG. 1, shows a version in which a damping valve 1 is installed on the side. This damping valve 1 is located in the vicinity of the bracket 18. The only difference from the conventional vibration damper illustrated in FIG. 1 is that in the equalization chamber between the work cylinder 13 and the jacket tube 14 there is an additional tube 4, which is equipped with a threaded ring 12, so that all that is required for the installation of the damping valve 1 is a hole 3 in the jacket tube 14. By means of the centering ring 2, which is centered with its extension 6 in the hole 3 of the jacket tube 14, and by means of the screw fitting which runs through the centering ring 2 on the threaded ring 12, the damping valve 1 can be used with a minimum of effort and expense on a conventional vibration damper like the one illustrated in FIG. 1.

Figure 3:
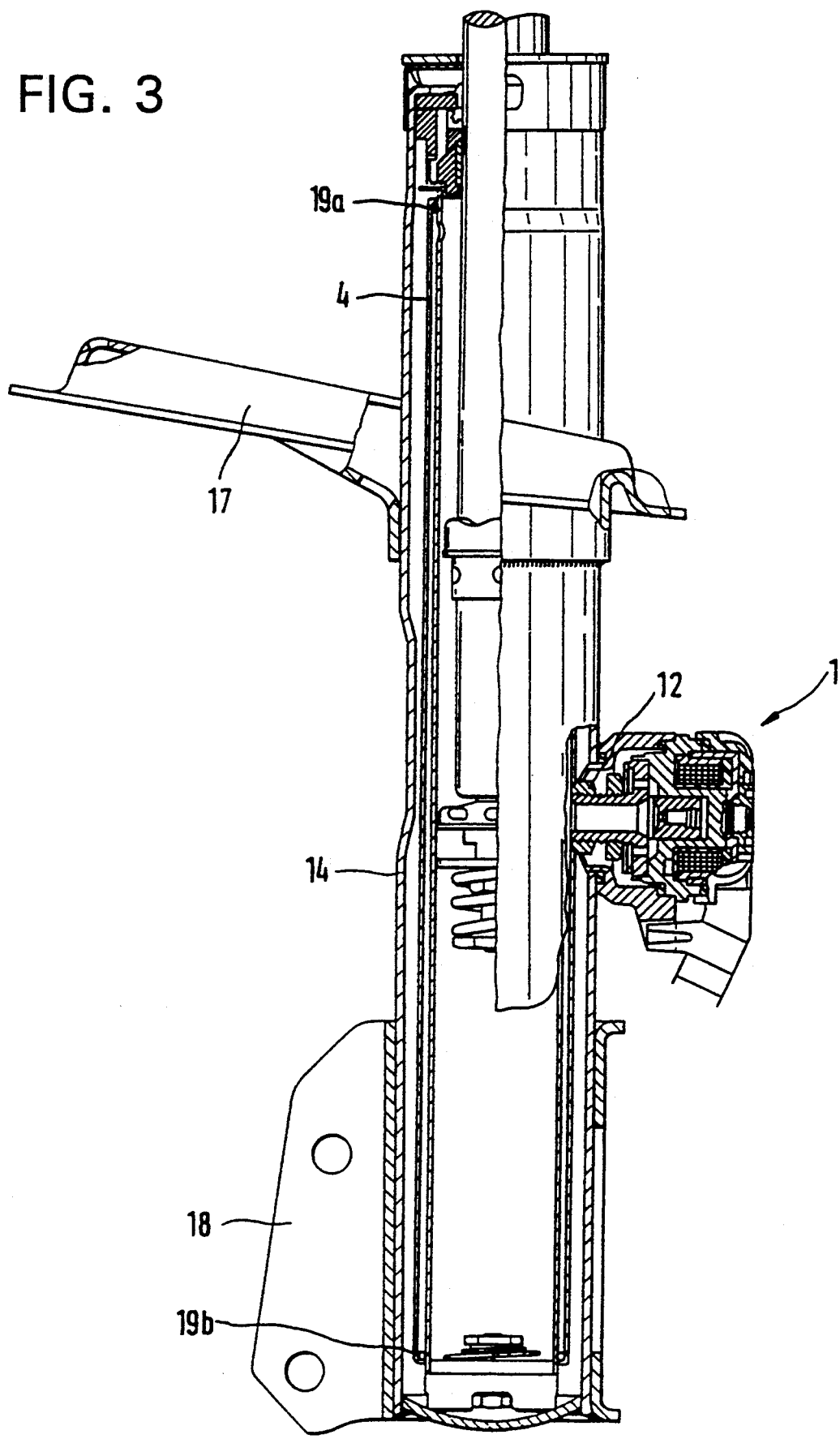
FIG. 3 shows an additional variant of a vibration damper with a damping valve located on the side.

FIG. 3 shows an additional embodiment of a damping valve 1 which is in principle like the one illustrated previously in FIG. 2, but with the difference that the connection of the damping valve 1 on the jacket tube 14 of the vibration damper is between the collar 17 and the bracket 18. To achieve proper contact of the screw fitting on the threaded ring 12, the tube 4 in each of its terminal regions 19a and 19b has an angled portion and a gasket, whereby the angled portion achieves the correct contact and support in the vicinity of the valve base and in the vicinity of the piston rod guide.

Figure 4:
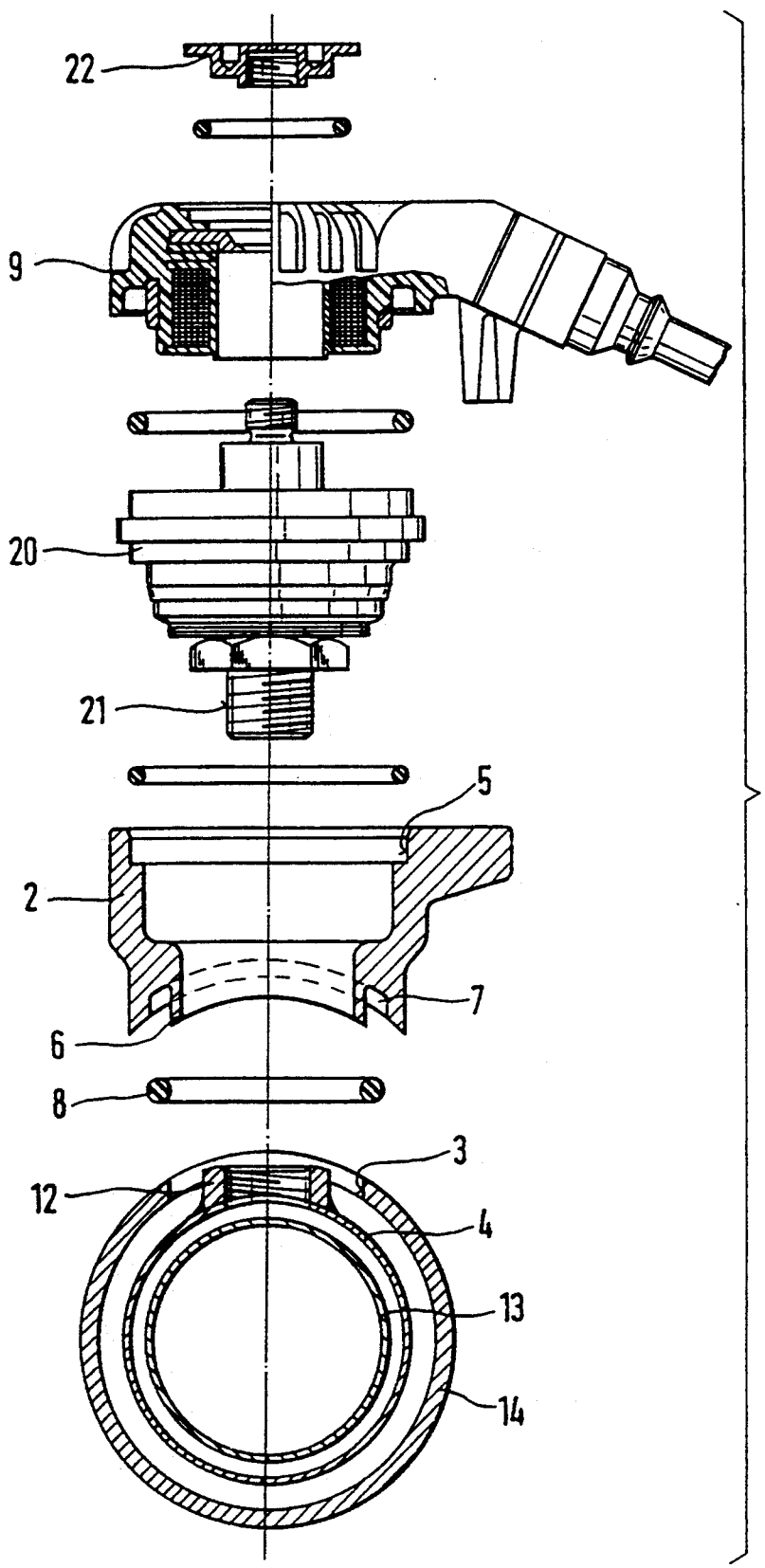
FIG. 4 shows an exploded view of the individual parts of a controllable damping valve located on the side of a vibration damper.

In FIG. 4, which shows the work cylinder 13 and the jacket tube 14, the tube 4 is located inside the equalization chamber and is equipped with a threaded ring 12. To this base, the gasket 8, the centering ring 2, an additional gasket, the valve core 20 and finally the housing 9 with the electrical parts are threaded on.

By means of the screw fitting 21, the valve core 20 with the centering ring 2 is held by means of the threaded ring 12 in the tube 4, while an additional screw fitting 22 fixes the housing 9 in relation to the valve core 20. The centering ring 2 is provided with a groove 7 to hold the gasket 8 and with an extension 6 for centering in the hole 3 of the jacket tube 14. As a result of the screw fitting 21, which extends through the centering ring 2, a proper seal of the centering ring 2 with the gasket 8 against the outer surface of the jacket tube 14 is guaranteed. To hold the valve core 20, the centering ring 2 is provided with an additional hole 5.

FIGS. 5A and 5B show a centering ring 2 which is a compound structure comprising an external casting and an internal sheet metal part.

FIGS. 6A and 6B show a centering ring 2 which is a compound structure comprising two sheet metal parts.

Figure 7:
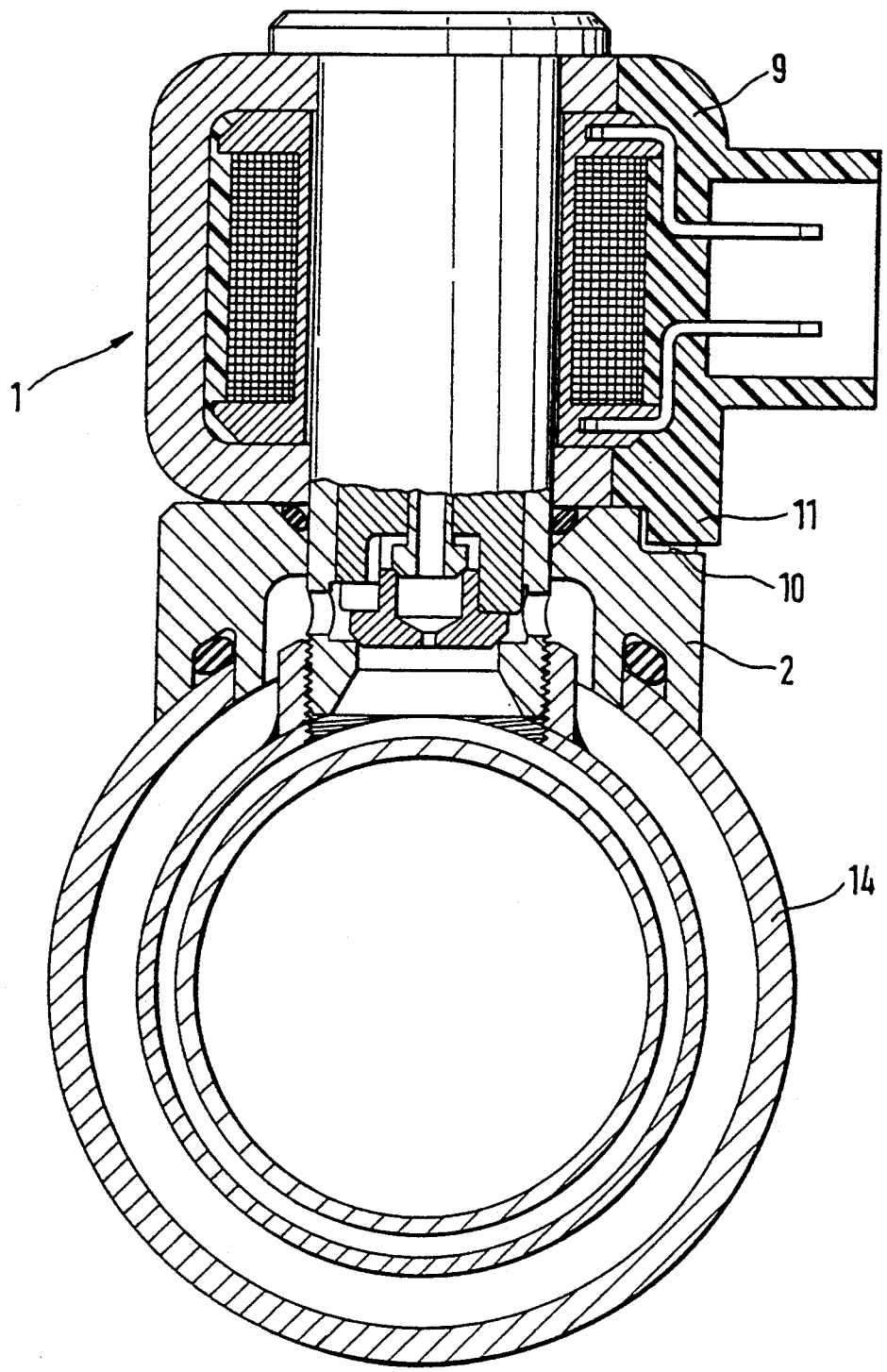
FIG. 7 shows a cross section through a vibration damper in the vicinity of the lateral damping valve, with protection against twisting between the centering ring and the housing of the damping valve.

FIG. 7 shows a centering ring 2 which is provided with a recess 10 in which a projection 11 of the housing 9 of the damping valve 1 is engaged, so that the housing 9 is protected against twisting in relation to the centering ring 2. Several recesses 10 can also be made on the circumference of the centering ring 2, so that various positions of the housing 9 are possible in relation to the jacket tube 14. These various positions of the housing 9 are used for the proper routing of electrical cables.

In other words, the vibration damper illustrated in FIG. 1 is a conventional vibration damper wherein the work cylinder 13 is equipped with a jacket tube 14 to form an equalization chamber. The equalization chamber may be the chamber between the work cylinder 13 and the jacket tube 14. The damping piston 16 fastened to the piston rod 15 divides the work cylinder 13 into two work chambers. The equalization chamber may communicate with each of the two work chambers. The communication between the equalization chamber and at least one of the two work chambers may be through a valve. A collar 17 and a bracket 18 are attached to the jacket tube 14 for mounting the vibration damper on a vehicle.

Figure 2A:
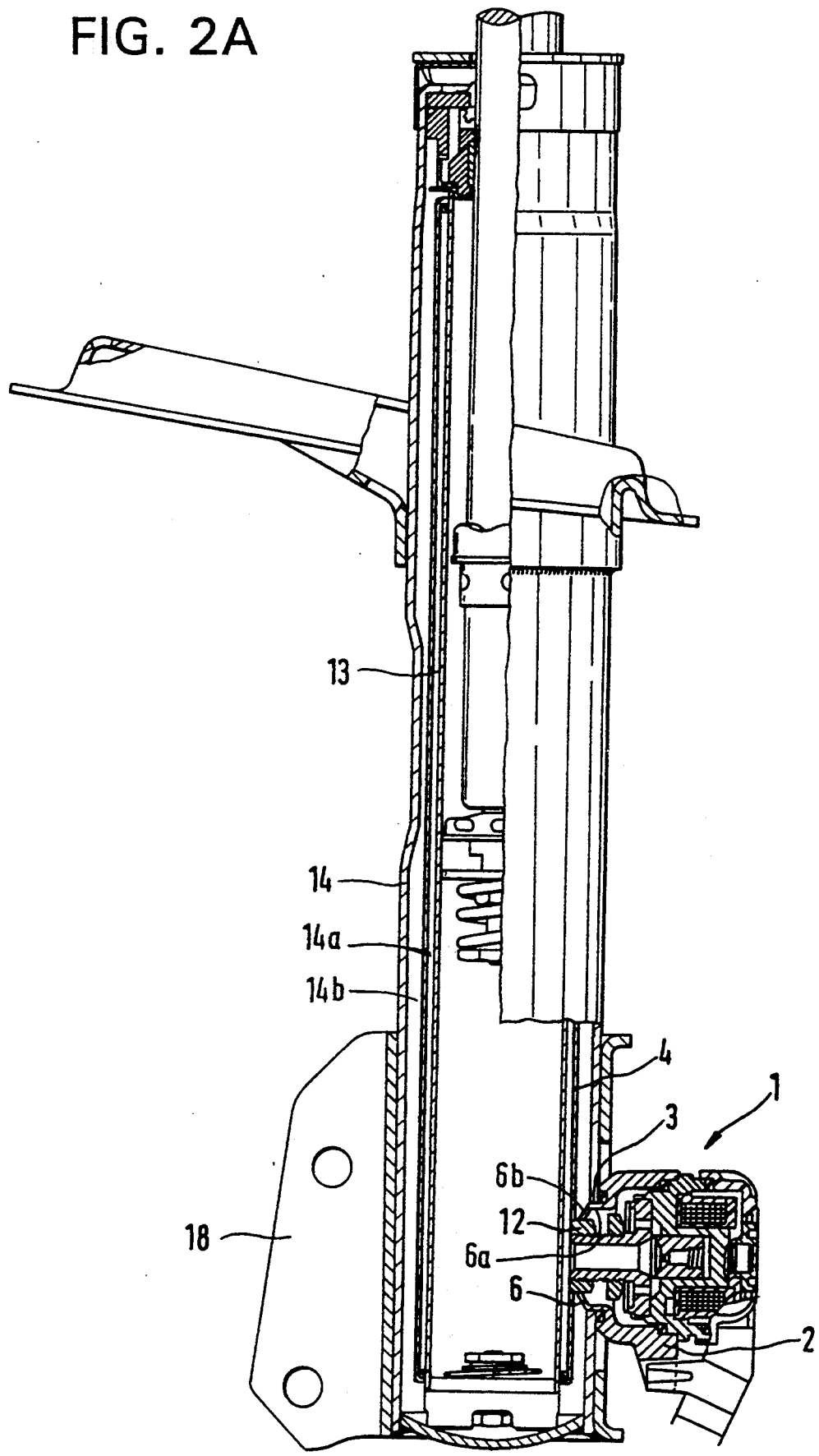
FIG. 2A shows the same vibration damper as FIG. 2 with additional reference numerals.

FIG. 2A, which is based on a conventional vibration damper like the one illustrated in FIG. 1, shows a version in which a damping valve 1 is installed on the side of the vibration damper. This damping valve 1 is located in the vicinity of the bracket 18. There may be only two modifications to a conventional vibration damper like the one illustrated in FIG. 1 required in order to be able to install the damping valve 1 on the side of the vibration damper. One modification may be the addition of the tube 4 which is equipped with the threaded ring 12. The threaded ring 12 has an inside radial edge. Preferably the tube 4 has a hole aligned with the inside radial edge of the threaded ring 12. Such a hole in the tube 4 would allow damping fluid to flow between the damping valve 1 and one or two of the work chambers of the work cylinder 13. The other modification may be the cutting of the hole 3 in the jacket tube 14. Preferably the hole 3 is centered on the threaded ring 12. By means of the centering ring 2, which is centered with its extension 6 in the hole 3 of the jacket tube 14, and by means of the screw fitting 21 which runs through the centering ring 2 on the threaded ring 12, the damping valve 1 can be installed with a minimum of effort and expense on a conventional vibration damper like the one illustrated in FIG. 1.

As shown in FIG. 2A, the tube 4 may divide the equalization chamber into an equalization subchamber 14a inside the tube 4 and an equalization subchamber 14b outside the tube 4. The extension 6 is shown as having a cylindrical section 6a extending through the jacket tube 14 from outside. The extension 6 is also shown as having a conical section 6b extending from the cylindrical section 6a inward toward the tube 4 and inward radially with respect to the cylindrical section 6a. The conical section 6b is shown as contacting the threaded ring 12 on the outer circumferential surface of the threaded ring 12. The conical section 6b may facilitate centering the centering ring 2 on the threaded ring 12. The conical section 6b preferably does not contact the threaded ring 12 around the entire circumference of the threaded ring 12. In some embodiments it may be preferable or necessary that a gap between the extension 6 and the threaded ring 12 be a part of a passage through the damping valve 1 to the equalization subchamber 14a.

Figure 3A:
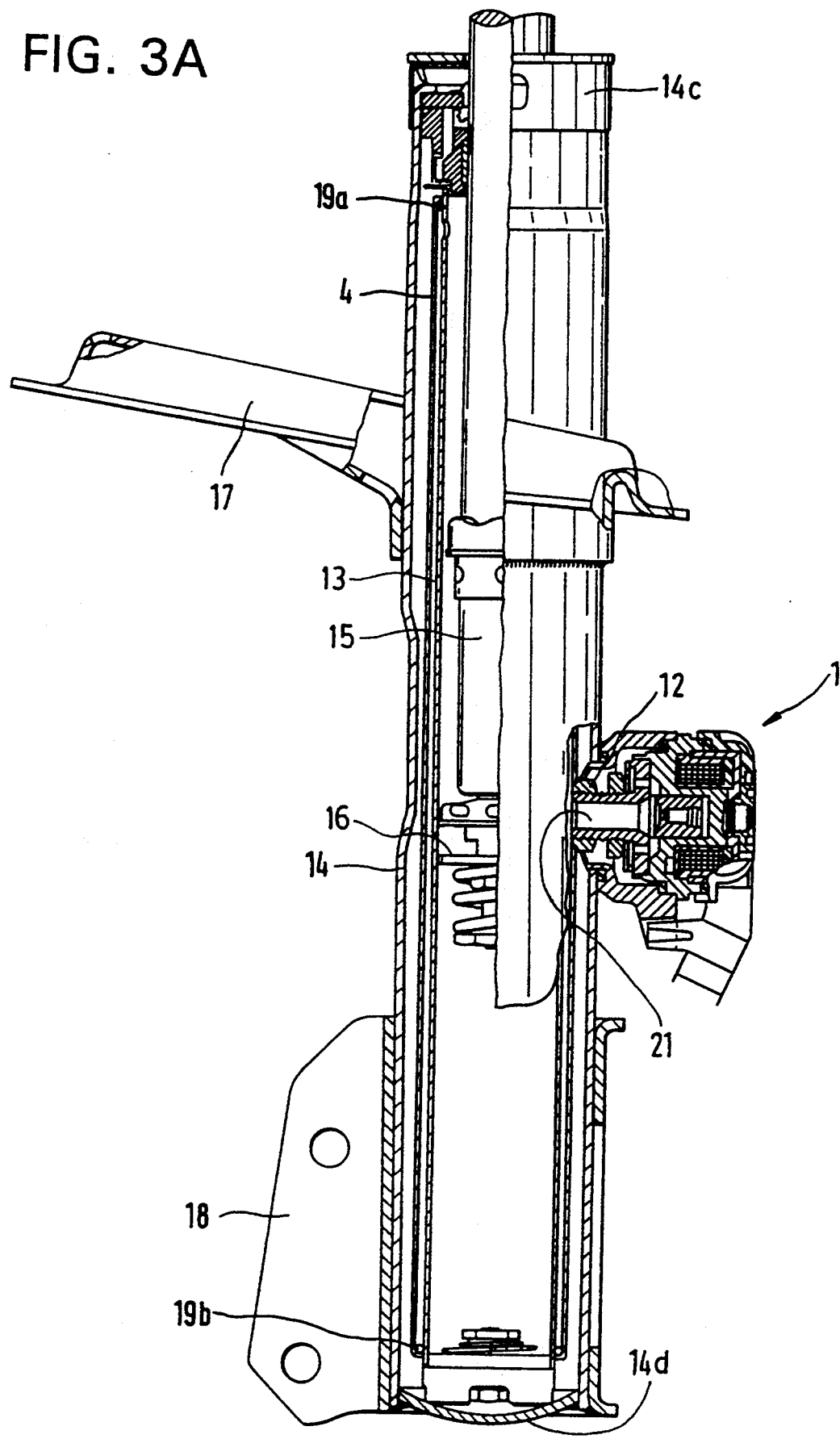
FIG. 3A shows the same vibration damper as FIG. 3 with additional reference numerals.

FIG. 3A shows an additional embodiment of a damping valve 1 which is in principle like the one illustrated previously in FIGS. 2 and 2A, but with the difference that the damping valve 1 is installed between the collar 17 and the bracket 18 rather than at the same location as the bracket 18 along the length of the jacket tube 14.

The tube 4 may have an angled portion and a gasket at each of its ends 19a and 19b. The angled portions and gaskets may facilitate the alignment of the threaded ring 12 of the tube 4 with the hole 3 and with the screw fitting 21 which engages the threaded ring 12. The angled portions and gaskets may also facilitate supporting the tube 4 on the work cylinder 13 with the correct contact between the tube 4 and the work cylinder 13.

Figure 4A:
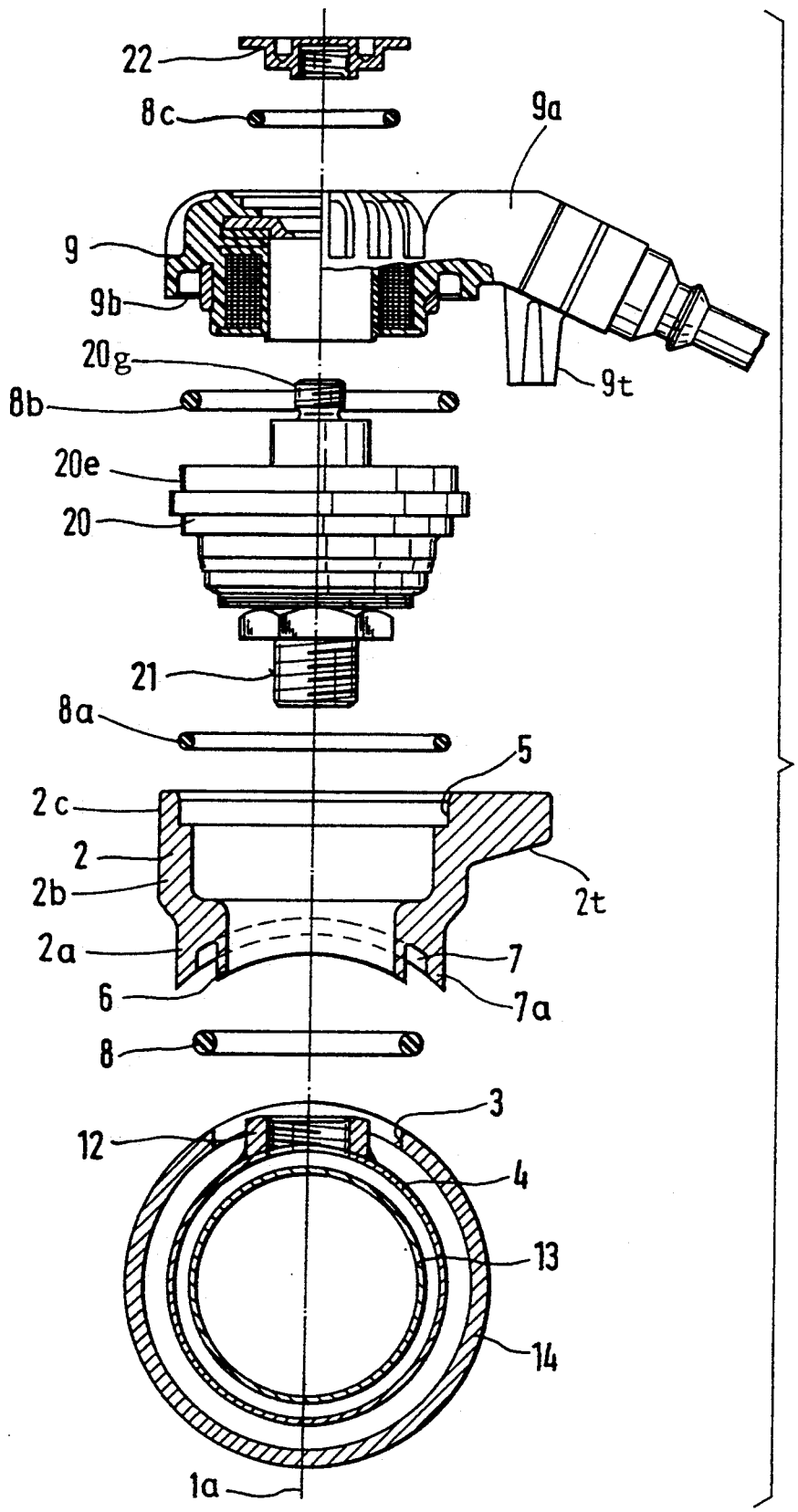
FIG. 4A shows the same vibration damper as FIG. 4 with additional reference numerals.

FIG. 4A shows the work cylinder 13, the tube 4 and the jacket tube 14 as being substantially coaxial and therefore having substantially coinciding longitudinal axes. An axis 1a preferably passes through the longitudinal axis of the tube 4 and is transverse, preferably perpendicular, to the longitudinal axis of the tube 4.

The tube 4 is preferably equipped with a threaded ring 12. The threaded ring 12 is preferably centered on axis 1a. The threaded ring 12 has an inner radial surface and an outer radial surface. Preferably the inner radial surface of the threaded ring 12 is threaded and the outer radial surface of the threaded ring 12 is not. The threaded ring 12 is preferably rigidly attached to the tube 4 by welding or some other means. Any welds between the threaded ring 12 and the tube 4 are preferably on the outer radial surface of the threaded ring 12. The jacket tube 14 has an inner surface and an outer surface. The threaded ring 12 preferably extends from the tube 4 past the inner surface of the jacket tube 14, but not past the outer surface of the jacket tube 14.

The tube 4 preferably has a hole centered on axis 1a, which hole preferably is aligned with the inside radial surface of the threaded ring 12.

The hole 3 in the jacket tube 14 is preferably centered on axis 1a. The hole 3 preferably is shaped such that the entire edge of the hole 3 would contact a cylinder inserted into the hole 3 with the longitudinal axis of the cylinder oriented parallel to axis 1a. Therefore, the hole 3 preferably appears circular when viewed from a distance along axis 1a.

The centering ring 2 is preferably centered on axis 1a. The centering ring 2 has a first end and a second end along axis 1a, with the first end being adjacent to the jacket tube 14. The first end of the centering ring 2 has an extension 6. The extension 6 is preferably centered on axis 1a and cylindrical. The extension 6 has an outer radial surface, which outer radial surface has a diameter, which diameter is such that the extension 6 can fit, preferably snugly, into the hole 3. Preferably the extension 6 extends from outside the jacket tube 14 to the inner surface of the jacket tube 14. Preferably the extension 6 is flush with the inner surface of the jacket tube 14 and follows the contour of the inner surface of the jacket tube 14. Therefore, extension 6 has an edge which edge preferably is shaped such that the entire edge would contact a cylinder having a longitudinal axis parallel to the longitudinal axis of the tube 4.

The first end of the centering ring 2 preferably has an extension 7a. The extension 7a is preferably centered on axis 1a and cylindrical. The extension 7a has an inner radial surface, which inner radial surface has a diameter, which diameter is greater than the diameter of the outer radial surface of the extension 6. The extension 7a preferably follows the contour of the outer surface of the jacket tube 14. Preferably the extension 7a is the part of the centering ring 2 that rests against the outer surface of the jacket tube 14 and thereby prevents the centering ring 2 from moving closer to the tube 4.

The first end of the centering ring 2 preferably has a groove 7. The groove 7 is preferably centered on axis 1a and cylindrical. The groove 7 is preferably formed by the inner radial surface of the extension 7a and the outer radial surface of the extension 6. The dimensions of the groove 7 are preferably such that an effective seal between the centering ring 2 and the jacket tube 14 can be created by a gasket 8 inserted in the groove 7.

The centering ring 2 has a hole 5. The hole 5 is preferably centered on axis 1a. l The hole 5 may have sections having different diameters, and therefore the centering ring 2 may have corresponding sections having different inside diameters. The configuration of the hole 5 for a particular embodiment of the invention may be strongly influenced by the design of the valve core used in the particular embodiment. In the embodiment shown in FIGS. 4 and 4A, the centering ring 2 has a first section 2a having a first inside diameter at the first end of the centering ring 2. The first section 2a of the centering ring 2 extends from the first end toward the second end of the centering ring 2 past the extension 6. Further from the first end of the centering ring 2, the centering ring 2 has a second section 2b having a second inside diameter, the second inside diameter being greater than the first inside diameter. Still further from the first end of the centering ring 2, the centering ring 2 has a third section 2c having a third inside diameter, the third inside diameter being greater than the second inside diameter. The centering ring 2 has an annular surface between the second section 2b and the third section 2c. Preferably the gasket 8a can be placed on the annular surface between the second section 2b and the third section 2c to form a seal between the centering ring 2 and the valve core 20. Finally, the centering ring 2 may have a chamfer adjacent to the hole 5 at the second end of the centering ring 2. The chamfer might facilitate the insertion of the valve core 20 into the hole 5.

The outside diameter of the centering ring 2 may vary.

The centering ring 2 preferably has at least one tab 2t. The tab 2t preferably extends radially outward from the outer surface of the centering ring 2. The tab 2t is preferably on the second end of the centering ring 2.

The valve core 20 is preferably centered on axis 1a. The valve core 20 has a first end and a second end along axis 1a, with the first end being located between the work cylinder 13 and the second end. The first end of the valve core 20 preferably has a screw fitting 21. The screw fitting 21 is preferably rigidly attached to the valve core 20. The screw fitting 21 has a length along axis 1a. The screw fitting 21 is preferably hollow along the entire length of the screw fitting 21. Preferably the screw fitting 21 has an inner radial surface and an outer radial surface. Preferably the outer radial surface of the screw fitting 21 is threaded and the inner radial surface of the screw fitting 21 is not. Preferably the screw fitting 21 is threaded such that the screw fitting 21 and the threaded ring 12 may threadedly engage each another.

The second end of the valve core 20 preferably has a screw fitting 20g. The screw fitting 20g is preferably rigidly attached to the valve core 20. The screw fitting 20g has an outer radial surface. Preferably the outer radial surface of the screw fitting 20g is threaded.

The valve core 20 has a first outer radial surface. The first outer radial surface of the valve core 20 may have several sections having different diameters. The valve core 20 may have an annular portion 20e.

The damping valve 1 preferably has a housing 9 containing the electrical parts of the damping valve 1. The housing 9 is preferably centered on axis 1a. The housing 9 has a first end and a second end along axis 1a, with the first end being located between the work cylinder 13 and the second end. The electrical parts preferably are disposed in the housing 9 at the first end of the housing 9. The first end of the housing 9 preferably has a groove 9b located radially outside the electrical parts. Preferably the damping valve 1 has a gasket 8b. Preferably the gasket 8b is disposed in the groove 9b. Preferably the annular portion 20e of the valve core 20 can be disposed in the groove 9b over the gasket 8b, thereby forming a seal between the valve core 20 and the housing 9.

The housing 9 preferably has an electrical socket 9a. Preferably the electrical socket 9a extends radially outward from the housing 9. In the embodiment shown in FIGS. 4 and 4A, the housing 9 preferably has two tabs 9t. Preferably there is a space between the two tabs 9t. Preferably the space between the two tabs 9t is aligned with the tab 2t of the centering ring 2. Preferably the tab 2t can snugly fit in the space between the two tabs 9t, thereby protecting the housing 9 from twisting relative to the centering ring 2. The two tabs 9t may be disposed on the electrical socket 9a. The centering ring 2 may have more than one tab 2t around the circumference of the centering ring 2 so that the housing 9 may be placed at more than one position where the housing 9 is protected from twisting relative to the centering ring 2.

The electrical parts are preferably aligned on axis 1a. The housing 9 is preferably hollow along axis 1a such that the second end of the valve core 20 may be inserted into the housing 9 radially inside the electrical parts.

The damping valve 1 preferably has a screw fitting 22. The screw fitting 22 preferably has an inner radial surface, which inner radial surface is preferably threaded such that the screw fitting 22 and the screw fitting 21 may threadedly engage each other. The damping valve 1 preferably has a gasket 8c. The second end of the housing 9 preferably has a recess such that the gasket 8c may be disposed in the recess, and such that the screw fitting 22 may be disposed over the gasket 8c and tightened onto the screw fitting 21, thereby sealing the second end of the housing 9.

A possible method of installing a damping valve 1 on a hydraulic adjustable vibration damper according to the embodiment shown in FIGS. 4 and 4A may be as follows. A tube 4, a threaded ring 12, a jacket tube 14, a work cylinder 13, a centering ring 2, a gasket 8, a gasket 8a, a valve core 20, a gasket 8b, a housing 9, a gasket 8c and a screw fitting 22 are provided. Preferably the centering ring 2 has a hole 5, an extension 6, an extension 7a and a groove 7. Preferably the valve core 20 has a screw fitting 21, a screw fitting 20g and an annular portion 20e. Preferably the housing 9 has electrical parts, a first end, a second end, a groove 9b in the first end, a recess in the second end, an electrical socket 9a and two tabs 9t. The threaded ring 12 is rigidly attached to the tube 4, preferably by welding, on the outer cylindrical surface of the tube 4. A hole is cut in the tube 4 such that the hole is aligned with the inside radial surface of the threaded ring 12. The hole may be cut either before or after rigidly attaching the threaded ring 12 to the tube 4. A hole 3 is cut in the jacket tube 14 such that the hole 3 may be aligned with the threaded ring 12, and such that the extension 6 can fit snugly in the hole 3. The tube 4 is inserted in the jacket tube 14 and the work cylinder 13 is inserted in the tube 4. The threaded ring 12 is aligned with the hole 3. The work cylinder 13, the tube 4 and the jacket tube 14 are connected such that the alignment between the threaded ring 12 and the hole 3 is maintained. The gasket 8 is inserted in the groove 7. The extension 6 of the centering ring 2 is inserted in the hole 3 such that the extension 7a is adjacent to the jacket tube 14 around the entire circumference of the extension 7a. The alignment between the threaded ring 12 and the hole 3 together with the snug fit of the extension 6 in the hole 3 results in the centering ring 2 being aligned with the threaded ring 12. The gasket 8a is inserted in the hole 5 of the centering ring 2. The valve core 20 is inserted in the hole 5 of the centering ring 2 such that the screw fitting 21 is aligned with the threaded ring 12. In some embodiments, such as the embodiment shown in FIG. 7, the valve core 20 is guided by the inner radial surface of the centering ring 2 into alignment with the threaded ring 12 as the valve core 20 is inserted into the hole 5. In other embodiments, such as the embodiment shown in FIGS. 4 and 4A, the valve core 20 when aligned with the threaded ring 12 does not touch the centering ring 2 until the valve core has been screwed into the threaded ring 12. The valve core 20 is attached to the tube 4 and jacket tube 14 by turning the valve core 20 such that the screw fitting 21 is screwed into the threaded ring 12, such that the gasket 8 forms a seal between the centering ring 2 and the jacket tube 14, and such that the gasket 8a forms a seal between the centering ring 2 and the valve core 20. The centering ring 2, being aligned with the threaded ring 12, holds the valve core 20 in a position in which the valve core is aligned with the threaded ring 12 after the screw fitting 21 has been screwed into the threaded ring 12. The gasket 8b is inserted in the groove 9b. The first end of the housing 9 is placed over the valve core 20 such that the tab 2t is inserted between the two tabs 9t, and such that the annular portion 20e of the valve core 20 is inserted in the groove 9b. The gasket 8c is inserted in the recess in the second end of the housing 9. The screw fitting 22 is aligned with the screw fitting 20g. The housing 9 is attached to the valve core 20 by screwing the screw fitting 22 onto the screw fitting 20g such that the gasket 8c seals the second end of the housing 9, and such that the gasket 8b forms a seal between the housing 9 and the valve core 20.

One method for assembling a vibration damper such as the one shown in FIG. 3A might comprise the following steps: the piston rod 15, including the piston 16, can be assembled and inserted into the work cylinder 13, an assembly comprising the piston rod 15, the work cylinder 13 and the tube 4 can be assembled and inserted into the jacket tube 14, and can be retained therein by fastening endcap 14c into position. The jacket tube 14, with the end piece 14d, the collar 17 and the bracket 18 can be assembled by welding the end piece 14d, the collar 17 and the bracket 18 into place. The damping valve 1 can be installed on the side of the vibration damper, preferably by using the steps described above.

One feature of the invention resides broadly in the hydraulic adjustable vibration damper with a work cylinder, a piston fastened to a piston rod and dividing the work cylinder into two work chambers, at least one additional tube coaxially surrounding the work cylinder and at least one controllable damping valve installed in a stationary and sealed manner on the side of the vibration damper, characterized by the fact that the damping valve 1 is held in a centered and sealed manner by means of a centering ring 2 in a hole 3 of the tube 14, and that the fastening is provided by means of a screw fitting running through the hole 5 of the centering ring 2.

Another feature of the invention resides broadly in the vibration damper, characterized by the fact that the centering ring 2 has an extension 6, which is engaged in the hole 3 of the tube 14.

Yet another feature of the invention resides broadly in the vibration damper, characterized by the fact that radially outside the extension 6 there is a groove 7 to hold a gasket 8 for a seal against the outer jacket surface of the tube 14.

Still another feature of the invention resides broadly in the vibration damper, characterized by the fact that the centering ring 2 is positively secured with the housing 9 of the damping valve 1 against twisting.

Another feature of the invention resides broadly in the vibration damper, characterized by the fact that as the positive form-fitting connection, the centering ring 2 has at least one recess 10 on its circumference, in which a corresponding projection 11 of the housing 9 is engaged.

Yet another feature of the invention resides broadly in the vibration damper, characterized by the fact that the housing 9 is a magnetic cap holding the electrical parts, which magnetic cap covers the mechanical valve parts and is permanently and tightly connected to the centering ring 2.

Still another feature of the invention resides broadly in the vibration damper, characterized by the fact that the centering ring 2 is an element manufactured by shaping without cutting.

Another feature of the invention resides broadly in the vibration damper, characterized by the fact that the centering ring 2 is a compound structure comprising at least two parts.

Yet another feature of the invention resides broadly in the vibration damper, characterized by the fact that the screw fitting is made in one of the tubes 4.

Still another feature of the invention resides broadly in the vibration damper, characterized by the fact that the tube 4 has a threaded ring 12.

In other embodiments the damping valve may be fastened by a screw fitting which runs through the hole of a centering ring, and the damping valve may have means for adjusting the length of the valve stroke. Thus, fastening features of the invention such as the fastening features shown in FIGS. 2, 2A, 3, 3A, 4, 4A, 5, 6 and 7, and valve stroke length adjusting features such as those shown in FIGS. 8, 8A, 9 and 10, may be combined in the same embodiment.

Figure 8:
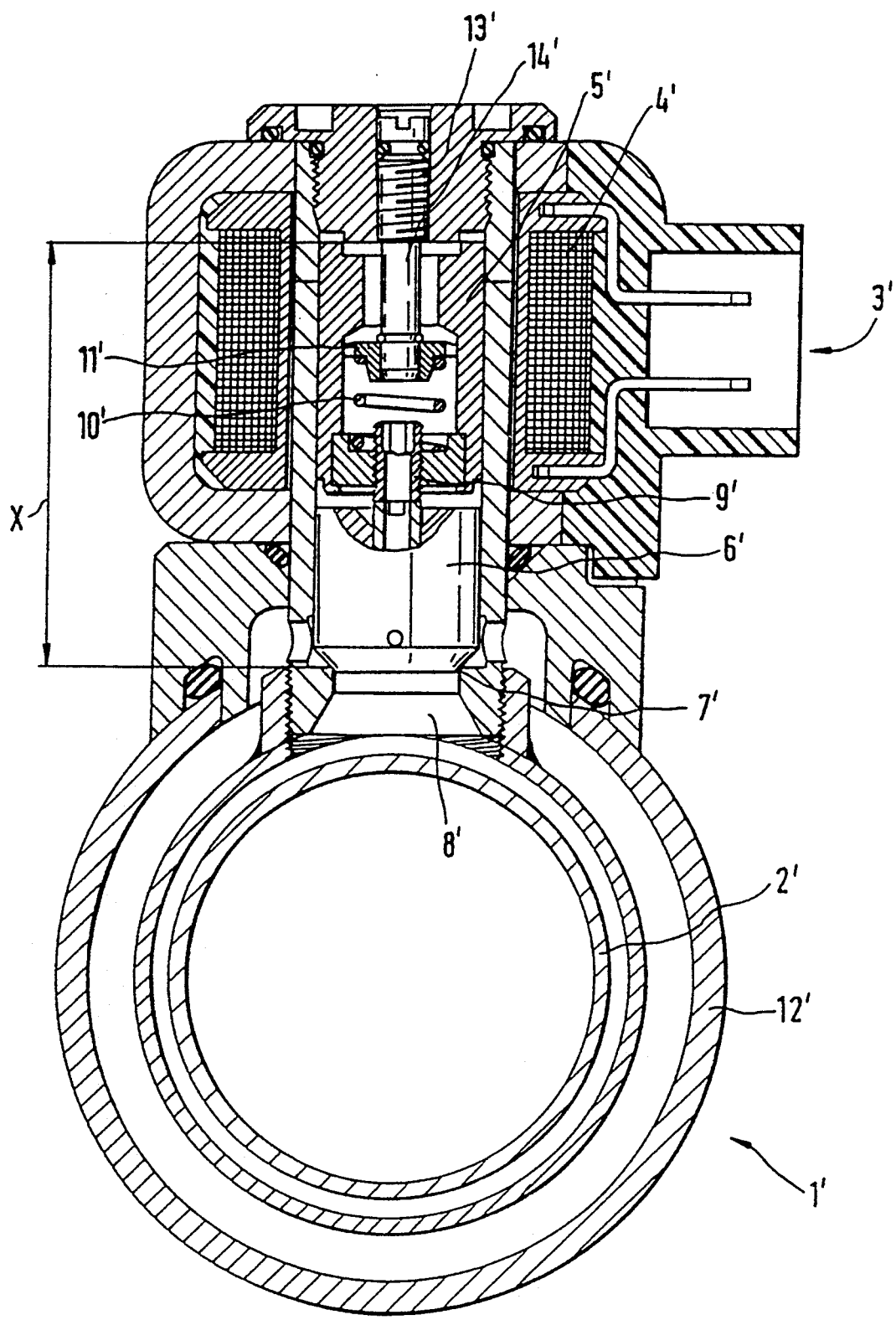
FIG. 8 shows a vibration damper together with an electromagnetically activated damping valve, in cross section.

FIG. 8 shows a vibration damper 1' in cross section, wherein for purposes of simplification, the work piston and the piston rod are not shown. The work cylinder 2' is surrounded by a jacket tube 12', on the outer circumferential surface of which there is an electrically controllable damping valve 3'. The electrically controllable damping valve 3' comprises in particular the coil 4', the armature 5' and the valve body 6'. The valve body 6' forms a valve seat 7', so that the flow passage 8' can be opened or closed.

The armature 5' is equipped with an adjusting screw 9', so that by means of an appropriate adjustment of the valve body 6', contact takes place. By means of an appropriate setting of the adjusting screw 9', an appropriate distance X can be set from the valve seat 7' to the upper end surface of the armature 5', so that the valve stroke can be correctly adjusted. Before the plugs 13' are installed, suitable tools can be used through the hole in the plugs 13' to adjust the hexagonal socket of the adjusting screw 9', so that the relative distance X can be set.

By means of the spring 10' and the stop plate 11', the prestress of the valve body 6' can be set by installing the plugs 13' at an appropriate distance on the pin 14'.

FIG. 8 relates to a piloted damping valve, wherein the individual parts which are necessary for the pilot control are located inside the inner chamber of the valve body 6'.

Figure 9:
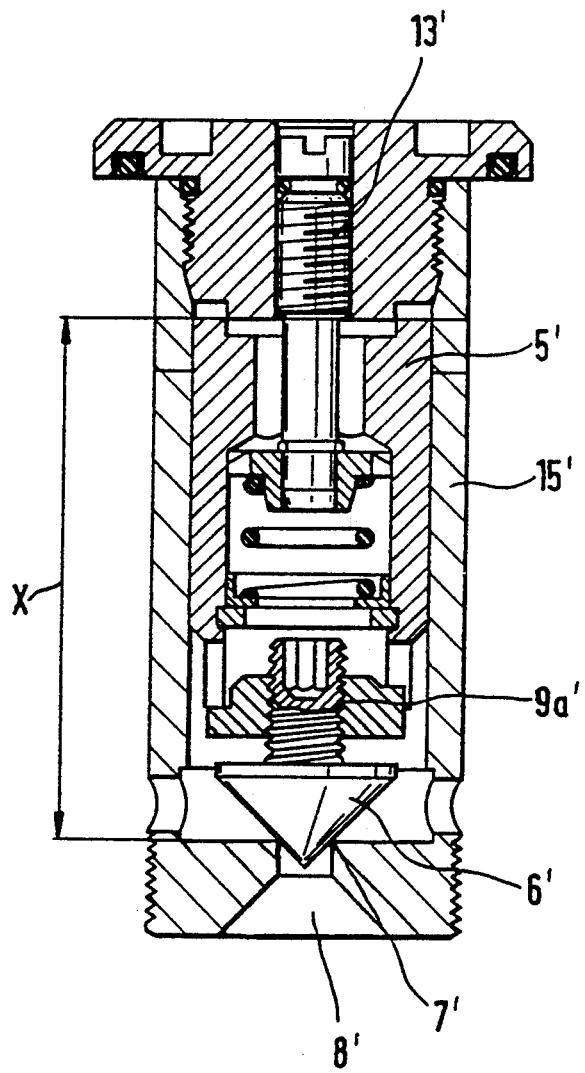
FIG. 9 shows an additional embodiment of an armature guide together with a magnetic armature and a valve body, as a detail in cross section.

FIG. 9 shows, in detail, an armature guide 15' of an electrically activated damping valve, wherein in the cylindrical internal chamber of the armature guide 15', the armature 5' and the valve body 6' are connected to one another by means of the screw fitting 9a'. In this configuration, too, a corresponding adjustment can be made by means of the hexagonal socket of the screw connection 9a' through the hole in the plugs 13'. This configuration relates to a directly-controlled damping valve, in which the flow passage 8' can also be regulated either continuously or in stages. As a result of the relative adjustment of the armature 5' in relation to the valve body 6' by means of the adjusting screw 9a', the relative distance X can be correctly set under mass production conditions in this configuration also.

Figure 10:
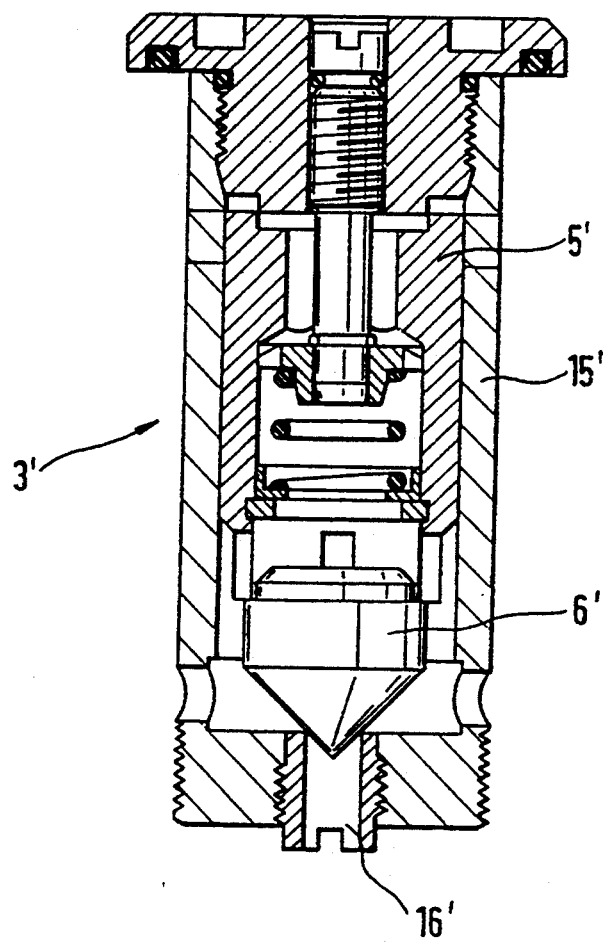
FIG. 10 shows an additional embodiment of the adjusting device.

FIG. 10 relates to an armature guide 15', in which in the lower region, the adjusting device is designed as a hollow-core screw 16' and can be axially adjusted in relation to the armature 5' and/or the valve body 6'. At the same time, the hollow-core screw 16' is used as a valve seat for the damping valve 3'.

Figure 11:
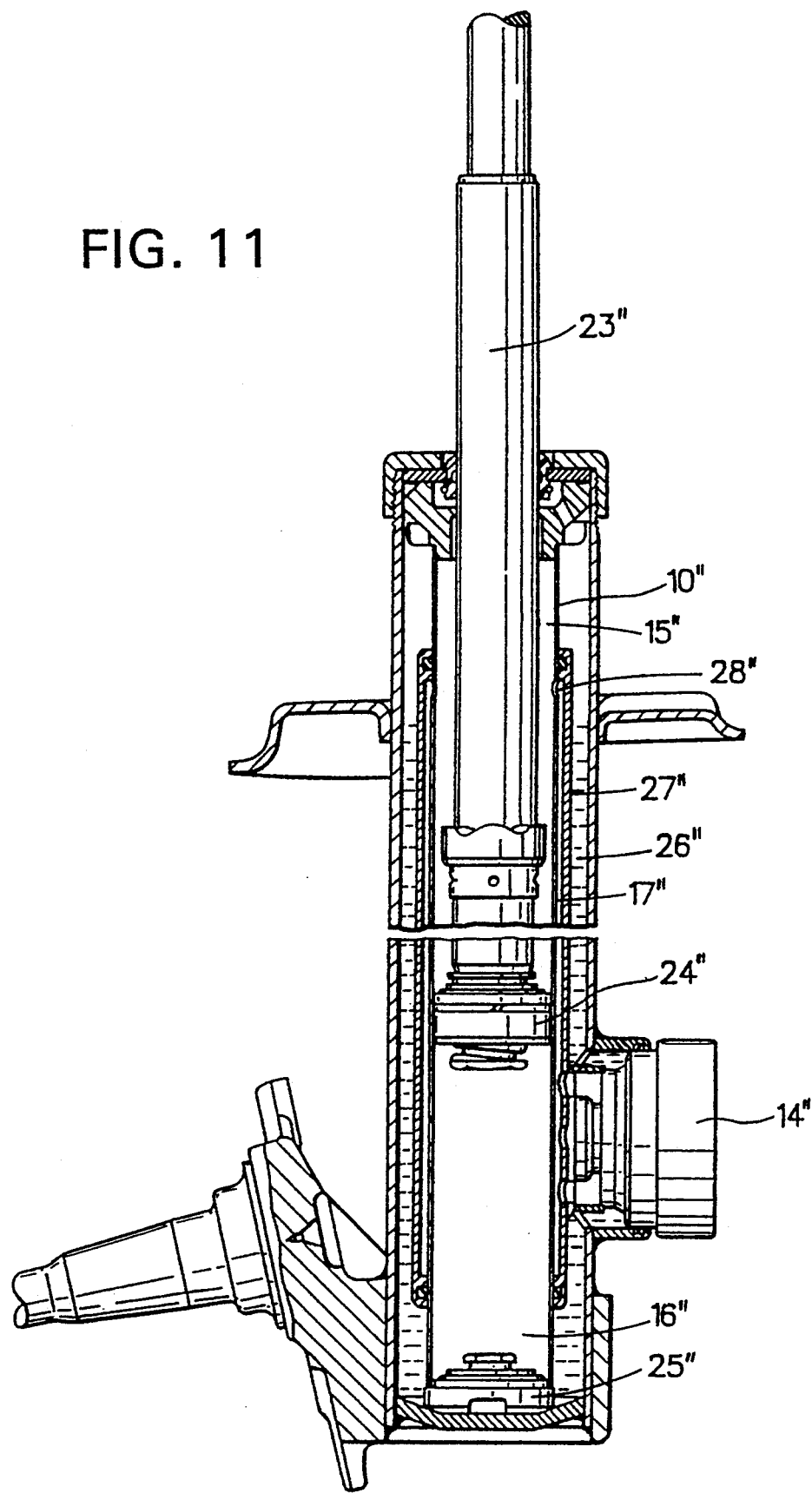
FIG. 11 shows a vibration damper together with an external damping valve.

FIG. 11 is a schematic illustration of a two-tube vibration damper, which comprises the work cylinder 10", a piston rod 23" and a piston 24" fastened to the piston rod 23". The piston 24" divides the work cylinder 10" into the upper work chamber 15" and the lower work chamber 16". The piston 24" is equipped with passages and throttle valves. In the base of the work cylinder 10", there is a base valve 25", by means of which the damping medium can get into the equalization chamber 26". In the equalization chamber 26", there is a tube 27'', which forms a bypass 17'' via the holes 28''. In this bypass 17'', there is a damping valve 14''. The bypass 17'' works parallel to the throttle valves of the damping piston 24'' and to the base valve 25''.

Figure 8A:
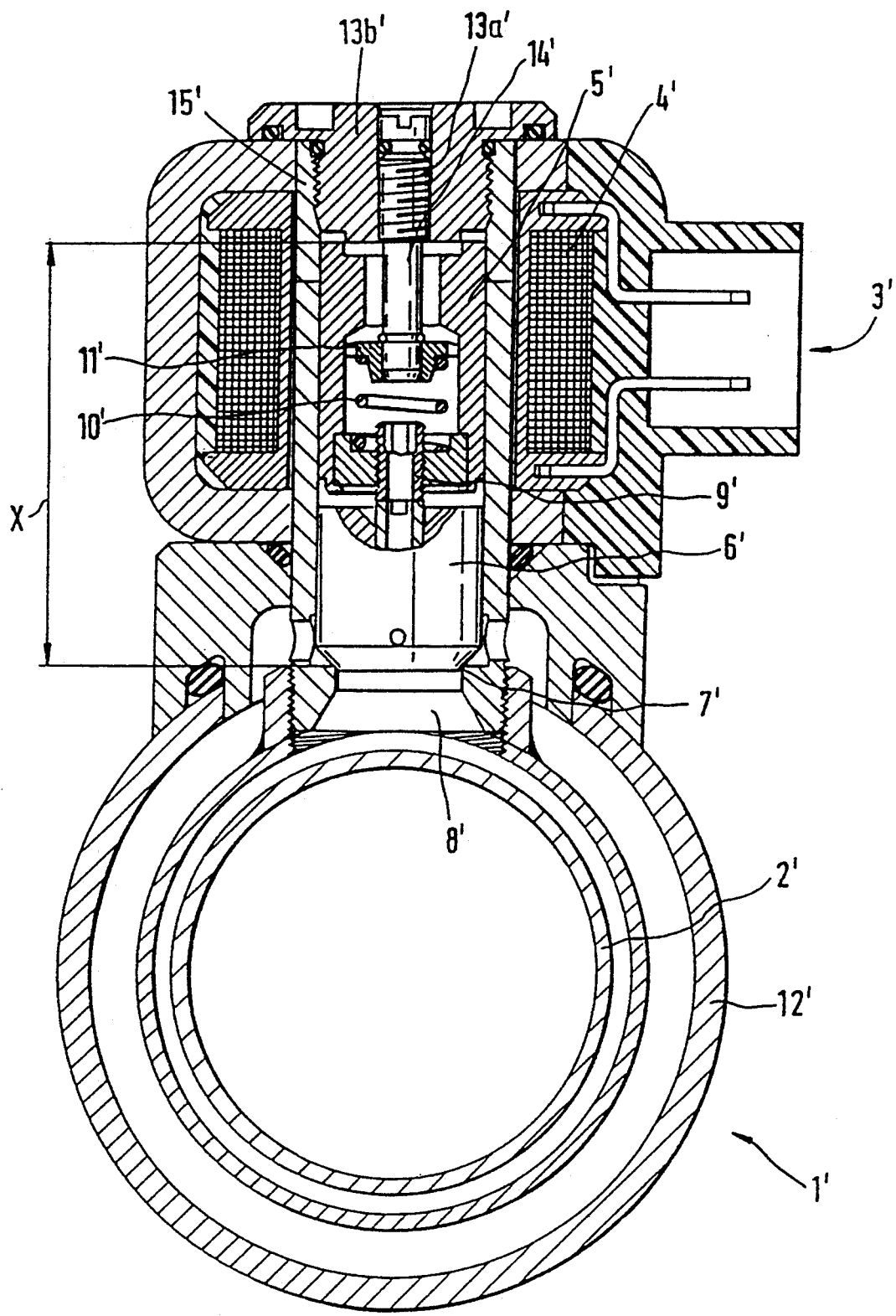
FIG. 8A shows the same vibration damper as does FIG. 8, with additional reference numerals.

In other words, FIG. 8A illustrates the same vibration damper 1' as does FIG. 8. FIG. 8A has additional reference numerals. FIG. 8A shows a vibration damper 1' in cross section, wherein for purposes of simplification, the work piston and the piston rod are not shown. The work cylinder 2' is surrounded by a jacket tube 12', on the outer circumferential surface of which there is an electrically controllable damping valve 3'. The electrically controllable damping valve 3' comprises in particular the coil 4', the armature 5', the valve body 6', the armature guide 15' and a valve seat 7'. Preferably the valve seat 7' is formed on the armature guide 15' at the lower end of the armature guide 15'. Preferably there is a flow passage 8' through the valve seat 7'. Preferably the valve body 6' is movable such that the valve body 6' may be moved away from the valve seat 7', thereby opening the flow passage 8', and the valve body 6' may be moved to contact the valve seat 7', thereby closing the flow passage 8'. Preferably the damping valve 3' further comprises a means, such as the outer plug 13b', for limiting the distance that the armature 5' can move in a direction away from the valve seat 7'. Preferably the limiting means limits the distance that the armature 5' can move by not moving when the armature 5' moves into contact with the limiting means. Limiting the distance that the armature 5' can move preferably limits the distance that the valve body 6' can move and therefore limits the valve stroke.

The armature 5' is equipped with an adjusting screw 9', which adjusting screw 9' is threadedly engaged in the armature 5'. Preferably the spring 10' biases the armature 5' toward the valve body 6', thereby causing the armature 5' and the valve body 6' to remain in contact with one another and to move as a unit. Preferably the valve body 6' and the armature 5' may be moved such that the valve body 6' contacts the valve seat 7' and the adjusting screw 9' contacts the valve body 6'. Preferably an adjustment of the adjusting screw 9' may be made while the armature 5', valve body 6' and adjusting screw 9' are so positioned. The adjusting screw 9' may have a hexagonal socket into which a suitable tool may be inserted to adjust the adjusting screw 9'. Preferably, adjusting the adjusting screw 9' adjusts the distance between the valve body 6' and the armature 5'. Preferably the adjusting screw 9' is adjusted such that an appropriate distance X is set between the valve seat 7' and the upper end surface of the armature 5', thereby correctly adjusting the valve stroke. Possibly the adjustment of the adjusting screw 9' may be made before either the outer plug 13b' or the inner plug 13a' is installed. Suitable tools might be used through holes in the armature 5' and the stop plate 11' to adjust the adjusting screw 9'. Possibly the adjustment of the adjusting screw 9' may be made after the outer plug 13b' is installed, but before the inner plug 13a' is installed in an axial hole in the outer plug 13b'. Such a possible adjustment might require suitable tools that may be used through the hole in the outer plug 13b' as well as through the holes in the armature 5' and the stop plate 11'.

Preferably the inner plug 13a' comprises a pin 14' and the pin 14' may engage the stop plate 11'. Preferably the spring 10' is compressed between the stop plate 11' and the inside lower surface of the armature 5', thereby biasing the armature 5' toward the valve body 6'. Preferably by adjusting the axial position of the inner plug 13a', and therefore the axial position of the pin 14', the axial position of the stop plate may be adjusted, thereby adjusting the prestress in the spring 10' and, via the armature 5' and the adjusting screw 9', the biasing force on the valve body 6'.

FIG. 9 shows a configuration in which the adjusting screw 9a' is preferably rigidly attached to the valve body 6'. Preferably the distance X between the valve seat 7' and the upper end surface of the armature 5', and therefore the adjustment of the valve stroke, may be set in the configuration shown in FIG. 9 in the manner discussed above for the configuration shown in FIG. 8A.

FIG. 10 shows an additional configuration having a different adjusting device for adjusting the valve stroke. Preferably the position to which the armature 5' can move furthest away from the valve seat is fixed with respect to the armature guide 15'. It may be that in the configuration shown in FIG. 10, the valve seat may be moved axially relative to the rest of the armature guide 15', thereby allowing the valve stroke to be adjusted without adjusting the axial distance between the valve body 6' and the armature 5'. Preferably the valve seat is on the upper end surface of a hollow-core screw 16' rather than being formed as a constriction on the inner cylindrical surface of the armature guide 15'. The hollow-core screw 16' preferably can be axially adjusted in relation to the armature guide 15', thereby adjusting the position of the upper end surface of the armature 5' when the valve body 6' is in contact with the valve seat.

Other configurations may have both an adjusting device which moves a valve seat with respect to an armature guide which is fixed relative to the furthest position of the armature from the valve seat, such as the adjusting device shown in FIG. 10, and an adjusting device which adjusts the distance between a valve body and an armature, such as the adjusting devices shown in FIG. 8A and in FIG. 9.

One feature which may be used in conjunction with the invention resides broadly in the hydraulic adjustable vibration damper with a piston fastened to a piston rod and dividing a work cylinder into two work chambers filled with damping fluid, whereby at least partly to control the damping force, an electromagnetically activated damping valve comprising a coil, a magnetic armature, a valve body and a valve seat pressurizes a flow passage, characterized by the fact that there is an adjusting device for the valve body 6'.

Another feature which may be used in conjunction with the invention resides broadly in the vibration damper, characterized by the fact that the connection between the armature 5' and the valve body 6' can be axially adjusted, to serve as the adjustment device.

Yet another feature which may be used in conjunction with the invention resides broadly in the vibration damper, characterized by the fact that an adjusting screw or set screw 9' is the connection.

Still another feature which may be used in conjunction with the invention resides broadly in the vibration damper, characterized by the fact that the adjusting screw 9' is located inside the armature 5', against which the valve body 6' is braced.

Another feature which may be used in conjunction with the invention resides broadly in the vibration damper, characterized by the fact that the valve body 6' is equipped on the side facing the armature 5' with a threaded part 9a', which is engaged in a corresponding region of the armature 5'.

Yet another feature which may be used in conjunction with the invention resides broadly in the vibration damper, characterized by the fact that the connection is accessible from outside by means of recesses and can be adjusted.

Still another feature which may be used in conjunction with the invention resides broadly in the vibration damper, characterized by the fact that inside the armature 5' there is a spring 10', which can be prestressed by means of an axially adjustable stop plate 11'.

Another feature which may be used in conjunction with the invention resides broadly in the vibration damper, characterized by the fact that the stop plate 11' is accessible from outside.

Still another feature of the invention resides broadly in the vibration damper according, characterized by the fact that the connection is accessible from outside through the stop plate 11'.

Yet another feature which may be used in conjunction with the invention resides broadly in the vibration damper, characterized by the fact that the adjusting device is an axially adjustable hollow-core screw or banjo bolt, the end surface of which forms the valve seat.

The object, on a vibration damper with an electromagnetically activated damping valve, of designing the armature and the valve body so that the length of the valve stroke can be adjusted after the vibration damper has been assembled, is achieved by the valve body having an adjusting device.

According to one feature which may be used in conjunction with the invention, the connection between the armature and the valve body is designed so that it is axially adjustable.

One advantage of having an axially adjustable connection between the armature and the valve body is that compensation for manufacturing tolerances becomes possible, by a method which can be easily used under mass production conditions and which requires a minimum of added effort and expense during assembly. The adjustable connection makes possible a precise adjustment of the relative position of the inner parts, and both positive and negative tolerances can be compensated for with equal ease.

In accordance with an additional feature which may be used in conjunction with the invention, the connection is an adjusting screw. The adjusting screw can be advantageously located inside the armature, so that the valve body can be supported on the adjusting screw.

In an additional configuration, the valve body is provided on the side facing the armature with a threaded part, which is engaged in a corresponding area of the armature.

So that a precise adjustment of the relative position of the valve parts can be made after assembly, in accordance with an feature which may be used in conjunction with the invention, the connection is accessible and can be adjusted from the outside via holes. An advantage of this configuration is that after the setting has been made, the holes can be easily closed with vent plugs, drain plugs or similar devices.

In an additional configuration which may be used in conjunction with the invention, inside the armature there is a spring which can be prestressed by means of an axially adjustable stop plate. The stop plate is also advantageously accessible from outside.

In an additional configuration which may be used in conjunction with the invention, the connection between the armature and valve body is accessible from outside through the stop plate. Not only can the relative position of the internal parts of the valve be adjusted from outside, but at the same time the prestress of the valve body can also be set from outside by means of the spring and the corresponding stop plate, so that the adjustment can be performed after the complete assembly of the damping valve on the vibration damper. In an additional favorable configuration, the adjustment device is formed by an axially adjustable hollow-core screw, the end surface of which forms the valve seat.

One aspect of a feature which may be used in conjunction with the invention resides broadly in a vibration damper for motor vehicles, the damper comprising a cylinder assembly having an arrangement for varying damping of a piston assembly disposed therein, the piston assembly dividing the cylinder into at least two cheers, each for containing damping fluid, the vibration damper comprising: a device for throttling the damping fluid when the damping fluid moves from one of the chambers into another; the piston assembly having a piston rod and piston; the piston rod having a first device for attachment of the piston rod at one end thereof; the cylinder assembly having a second device for attachment at a portion thereon other than the first device for attachment at the piston rod; a device for bypassing damping fluid between the at least two chambers; a device for accepting bypassed damping fluid; the bypassing device being disposed to bypass the damping fluid from at least one of the damping fluid-containing chambers to the accepting device; the bypassing device including a valve device for regulating flow of the damping fluid in the bypassing device; and the valve device comprising: a valve seat and a displaceable component for opening and closing against the valve seat and for regulating flow of the damping fluid in the bypassing device; the displaceable component being displaceable between a closed position and an open position, the displaceable component being disposed against the valve seat in the closed position, the displaceable component being disposed away from the valve seat in the open position, and the displaceable component being configured for being displaceable a first distance between the closed position and the open position; and a device for adjusting the first distance between the closed position and the open position.

Some types of vibration dampers having welds thereon, or having parts welded thereto are disclosed in the following patents: U.S. Pat, No. 4,953,778 to Critton et. al., entitled "Method of Making Torsional Vibration Damper Having a Roll Spun Housing"; U.S. Pat. No. 4,872,369 to Critton et. al., entitled "Torsional Vibration Damper Having a Roll Spun Housing and Other Improvements"; U.S. Pat. No. 4,669,586 to Mettler, entitled "Pipe-Type Housing for a Shock Absorber Particularly of the TelesCopic Vibration Damper Type"; U.S. Pat. No. 4,660,436 to Dayoust and Pelus, entitled "Viscous Vibration Dampers"; and U.S. Pat. No. 3,901,359 to Jentsch, entitled "Hydraulic Twin-Tube Vibration Damper".

All, or substantially all,.of the components and methods of the various embodiments may be used in any combination with at least one embodiment or all of the embodiments, if any, described herein.

All of the patents, patent applications and publications recited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:

a first tube having a first end, a second end, a side and a hole;

a work cylinder disposed within said first tube;

a first chamber and a second chamber disposed within said work cylinder;

a piston assembly comprising a piston rod and a piston connected to said piston rod, said piston assembly being disposed within said work cylinder, said piston rod extending past said first end of said first tube, and said piston separating said first chamber from said second chamber;

a first end piece attached to said first end of said first tube, said first end piece having a hole, and said piston rod running through said hole in said first end piece;

a second end piece rigidly connected to said second end of said first tube;

a controllable valve for bypasing damping fluid bbetween said first chamber and said second chamber, said controllable valve comprising a valve body, which valve body has a first screw fitting;

a second screw fitting disposed within said first tube, said second screw fitting threadedly engaging said first screw fitting;

a centering ring disposed in said hole in said first tube, said centering ring being disposed about said controllable valve, said centering ring being sealed against said first tube, said centering ring stiffening said controllable valve against angular movement, said controllable valve being sealed against said centering ring, and said centering ring having a hole;

said centering ring has a first end and a first extension for aligning said centering ring in said hole in said first tube;

said first extension is disposed on said first end of said centering ring;

said first extension is disposed in said hole in said first tube;

said centering ring has means for bracing said centering ring against said first tube; said centering ring is braced against said first tube with said means for bracing said centering ring against said first tube;

said centering ring has first means for holding a gasket, which first means is disposed on said first end of said centering ring;

said means for bracing said centering ring against said first tube comprises a second extension disposed on said first end of said centering ring;

said second extension is in contract with said first tube;

said first means for holding a gasket comprises a groove in said centering ring, said groove being disposed between said first extension and said second extension;

said vibration damper further comprises a first gasket for sealing said centering ring against said first tube, said first gasket being disposed in said groove in said centering ring, and said first gasket being compressed between said centering ring and said first tube, thereby sealing said centering ring against said first tube;

said vibration damper further comprises a cap member for said valve body, said cap member having a hole, said cap member being attached to said valve body, and said cap member being secured against twisting relative to said valve body; and a second tube, said second tube being disposed in said first tube, said work cylinder being disposed in said second tube, said second tube being attached to said work cylinder, and said second screw fitting being attached to said second tube.

2. The vibration damper for a motor vehicle according to claim 1, wherein said cap member has a projection;

said centering ring has a recess for receiving said projection;

said projection of said cap member is disposed in said recess of said centering ring, thereby securing said cap member against twisting relative to said valve body;

said valve body has a first end, a second end and a third screw fitting;

said first screw fitting is disposed on said first end of said valve body;

said third screw fitting is disposed on said second end of said valve body;

said vibration damper further comprises a fourth screw fitting having a shoulder;

said third screw fitting is disposed in said hole in said cap member;

said fourth screw fitting and said third screw are screwed together;

said shoulder of said fourth screw fitting holds said cap member against one of:

a) said valve body, and b) said centering ring, thereby attaching said cap member to said one of:

a) said valve body, and b) said centering ring;

said cap member comprises a magnetic cap, electrical valve parts, and an electrical connector for being connected to said electrical valve parts;

said first extension fits snugly in said hole in said first tube;

said first e tension is cylindrical;

said first extension has an inner radial surface, an outer radial surface and an edge;

said inner radial surface of said first extension has a first diameter;

said outer radial surface of said first extension has a second diameter;

said second diameter is greater than said first diameter;

said hole in said centering ring is bounded by said inner radial surface of said first extension;

said second extension is cylindrical;

said second extension has an inner radial surface, an outer radial surface and an edge;

said inner radial surface of said second e tension has a third diameter;

said outer radial surface of said second extension has a fourth diameter;

said third diameter is greater than said second diameter;

said fourth diameter is greater than said third diameter;

said first extension and said second extension are coaxial;

said groove in said centering ring is bounded by said outer radial surface of said first extension and said inner radial surface of said second extension;

said centering ring comprises one of: an element manufactured as a single part, and a compound structure comprising at least two parts; and said cap member at least partially covers aid valve body.

3. A vibration damper for a motor vehicle made by the following method of assembling the vibration damper:

providing a piston and a piston rod;

assembling a piston assembly comprising the piston and the piston rod, which assembling comprises connecting the piston to the piston rod;

providing a work cylinder;

inserting the piston assembly into the work cylinder to divide the work cylinder into a first and second chamber;

providing a first tube having a first end, a second end, a side and a hole;

inserting the piston assembly and the work cylinder into the first tube with the piston rod extending past the first end of the first tube;

providing a second screw fitting, the second screw fitting comprising a threaded ring;

attaching the second screw fitting to a portion of the vibration damper for being disposed within the first tube;

aligning a second screw fitting with the hole in the first tube;

providing a first end piece having a hole;

fastening the first end piece to the first end of the first tube with the piston rod being disposed within the hole of the first end piece;

providing a second end piece;

rigidly connecting the second end piece to the second end of the first tube;

providing a centering ring, the centering ring having a hole, a first end and a first extension for aligning the centering ring in the hole in the first tube;

the first extension is disposed on the first end of the centering ring;

the centering ring having means for bracing the centering ring against the first tube;

the centering ring having first means for holding a gasket, which first means is disposed on the first end of the centering ring;

inserting the centering ring into the hole in the first tube by aligning the first extension with the hole in the first tube and inserting the first extension into the hole in the first tube;

said method further comprises bracing the centering ring against the first tube with the means for bracing the centering ring against the first tube;

providing a controllable valve for bypassing damping fluid between the first chamber and the second chamber, the controllable valve comprising a valve body, which valve body has a first screw fitting;

aligning the first screw fitting with the second screw fitting;

threadedly engaging the first screw fitting into the second screw fitting;

disposing the centering ring about the valve; and threadedly engaging a portion of the valve with the threaded ring while assembling the vibration damper, and thus:

sealing the valve against the centering ring, resulting in a seal between the valve and the centering ring in the assembled vibration damper;

sealing the centering ring against the first tube, resulting in a seal between the centering ring and the first tube in the assembled vibration damper; and stiffening the controllable valve against angular movement with the centering ring;

the means for bracing the centering ring against the first tube comprises a second extension disposed on the first end of the centering ring;

said step of bracing the centering ring against the first tube comprises bringing the second extension into contact with the first tube;

the first means for holding a gasket comprises a groove in the centering ring, the groove being disposed between the first extension and the second extension;

said method further comprises:

providing a first gasket for sealing the centering ring against the first tube; and inserting the first gasket into the groove in the centering ring;

said step of threadedly engaging a portion of the valve with the threaded ring results in compressing the first gasket between the centering ring and the first tube;

said method further comprises:

providing a cap member for the valve body, the cap member having a hole;

attaching the cap member to one of: the valve body and the centering ring;

securing the cap member against twisting relative to the valve body;

providing a second tube;

inserting the work cylinder into the second tube; and attaching the second tube to the work cylinder;

said step of attaching the second screw fitting to a portion of the vibration damper within the first tube comprises attaching the second screw fitting to the second tube; and said step of inserting the piston assembly and the work cylinder into the first tube comprises inserting:

the piston assembly, the work cylinder, and the second tube into the first tube.

4. The vibration damper for a motor vehicle made by the method according to claim 3, wherein the cap member has a projection;

the centering ring has a recess for receiving the projection;

said step of securing the cap member against twisting comprises inserting the projection of the cap member into the recess of the centering ring;

the valve body has a first end, a second end and a third screw fitting;

the first screw fitting is disposed on the first end of the valve body;

the third screw fitting is disposed on the second end of the valve body;

said method further comprises providing a fourth screw fitting having a shoulder;

said step of attaching the cap member to one of:
a) the valve body, and b) the centering ring, comprises:
placing the cap member over the valve body with the third screw fitting being disposed in the hole in the cap member;
aligning the fourth screw fitting with the third screw fitting; and
threadedly engaging the fourth screw fitting and the third screw fitting together, resulting in the shoulder of the fourth screw fitting holding the cap member against the same one of:
a) the valve body, and b) the centering ring;
the cap member comprises a magnetic cap, electrical valve parts, and an electrical connector for being connected to the electrical valve parts;
the first extension fits snugly in the hole in the first tube;
the first extension is cylindrical;
the first extension has an inner radial surface, an outer radial surface and an edge;
the inner radial surface of the first extension has a first diameter;
the outer radial surface of the first extension has a second diameter;
the second diameter is greater than the first diameter;
the hole in the centering ring is bounded by the inner radial surface of the first extension;
the second extension is cylindrical;
the second extension has an inner radial surface, an outer radial surface and an edge;
the inner radial surface of the second extension has a third diameter;
the outer radial surface of the second extension has a fourth diameter;
the third diameter is greater than the second diameter;
the fourth diameter is greater than the third diameter;
the first extension and the second extension are coaxial;
the groove in the centering ring is bounded by the outer radial surface of the first extension and the inner radial surface of the second extension;
the centering ring comprises one of: an element manufactured as a single part, and a compound structure comprising at least two parts; and
said method further comprises at least partially covering the valve body with the cap.

5. A method for producing a vibration damper for a motor vehicle, the vibration damper comprising: a first tube having a first end, a second end, a side and a hole; a work cylinder disposed within the first tube; a first chamber and a second chamber disposed within the work cylinder; a piston assembly comprising a piston rod and a piston connected to the piston rod, the piston assembly being disposed within the work cylinder, the piston rod extending past the first end of the first tube, and the piston separating the first chamber from the second chamber; a first end piece attached to the first end of the first tube, the first end piece having a hole, and the piston rod running through the hole in the first end piece; a second end piece rigidly connected to the second end of the first tube; a controllable valve for bypassing damping fluid between the first chamber and the second chamber, the controllable valve having a valve body with a first screw fitting; a second screw fitting disposed within the first tube, the second screw fitting threadedly engaging the first screw fitting; and a centering ring disposed in the hole in the first tube, the centering ring being disposed about the controllable valve, the centering ring being sealed against the first tube, the centering ring stiffening the controllable valve against angular movement, the controllable valve being sealed against the centering ring, and the centering ring having a hole; said method comprising the following steps of assembling the vibration damper by:
providing a piston and a piston rod;
assembling a piston assembly comprising the piston and the piston rod, which assembling comprises connecting the piston to the piston rod;
providing a work cylinder;
inserting the piston assembly into the work cylinder;
providing a first tube having a first end, a second end, a side and a hole;
inserting the piston assembly and the work cylinder into the first tube;
providing a second screw fitting, the second screw fitting having a threaded ring;
attaching the second screw fitting to a portion of the vibration damper for being disposed within the first tube;
aligning the second screw fitting with the hole in the first tube;
providing a first end piece having a hole;
fastening the first end piece to the first end of the first tube;
providing a second end piece;
rigidly connecting the second end piece to the second end of the first tube;
providing a centering ring, the centering ring having a hole, a first end and a first extension for aligning the centering ring in the hole in the first tube;
the first extension is disposed on the first end of the centering ring;
the centering ring having means for bracing the centering ring against the first tube;
the centering ring having first means for holding a gasket, which first means is disposed on the first end of the centering ring;
inserting the centering ring into the hole in the first tube by aligning the first extension with the hole in the first tube and inserting the first extension into the hole in the first tube;
said method further comprises bracing the centering ring against the first tube with the means for bracing the centering ring against the first tube;
providing a controllable valve for bypassing damping fluid between the first chamber and the second chamber, the controllable valve comprising a valve body, which valve body has a first screw fitting;
aligning the first screw fitting with the second screw fitting;
threadedly engaging the first screw fitting into the second screw fitting;
disposing the centering ring about the valve; and
threadedly engaging a portion of the valve with the threaded ring while assembling the vibration damper, and thus:
sealing the valve against the centering ring, resulting in a seal between the valve and the centering ring in the assembled vibration damper;
sealing the centering ring against the first tube, resulting in a seal between the centering ring and the first tube in the assembled vibration damper;
stiffening the controllable valve against angular movement with the centering ring;

the means for bracing the centering ring against the first tube comprises a second extension disposed on the first end of the centering ring;

said step of bracing the centering ring against the first tube comprises bringing the second extension into contact with the first tube;

the first means for holding a gasket comprises a groove in the centering ring, the groove being disposed between the first extension and the second extension;

said method further comprises:
providing a first gasket for sealing the centering ring against the first tube; and
inserting the first gasket into the groove in the centering ring; and said step of threadedly engaging a portion of the valve with the threaded ring results in compressing the first gasket between the centering ring and the first tube.

6. The method for producing a vibration damper for a motor vehicle according to claim 5, wherein said method further comprises providing a cap member for the valve body, the cap member having a hole;
attaching the cap member to one of: the valve body and the centering ring; and
securing the cap member against twisting relative to the valve body.

7. The method for producing a vibration damper for a motor vehicle according to claim 6, wherein said method further comprises:
providing a second tube;
inserting the work cylinder into the second tube; and
attaching the second tube to the work cylinder;
said step of attaching the second screw fitting to a portion of the vibration damper within the first tube comprises attaching the second screw fitting to the second tube; and
said step of inserting the piston assembly and the work cylinder into the first tube comprises inserting:
the piston assembly,
the work cylinder, and
the second tube
into the first tube.

8. The method for producing a vibration damper for a motor vehicle according to claim 7, wherein the cap member has a projection;
the centering ring has a recess for receiving the projection;
said step of securing the cap member against twisting comprises inserting the projection of the cap member into the recess of the centering ring;
the valve body has a first end, a second end and a third screw fitting;

the first screw fitting is disposed on the first end of the valve body;
the third screw fitting is disposed on the second end of the valve body;
said method further comprises providing a fourth screw fitting having a shoulder;
said step of attaching the cap member to one of:
a) the valve body, and b) the centering ring, comprises:
placing the cap member over the valve body with the third screw fitting being disposed in the hole in the cap member;
aligning the fourth screw fitting with the third screw fitting; and
threadedly engaging the fourth screw fitting and the third screw fitting together, resulting in the shoulder of the fourth screw fitting holding the cap member against the same one of:
a) the valve body, and b) the centering ring; and
the cap member comprises a magnetic cap, electrical valve parts, and an electrical connector for being connected to the electrical valve parts.

9. The method for producing a vibration damper for a motor vehicle according to claim 8, wherein the first extension fits snugly in the hole in the first tube;
the first extension is cylindrical;
the first extension has an inner radial surface, an outer radial surface and an edge;
the inner radial surface of the first extension has a first diameter;
the outer radial surface of the first extension has a second diameter;
the second diameter is greater than the first diameter;
the hole in the centering ring is bounded by the inner radial surface of the first extension;
the second extension is cylindrical;
the second extension has an inner radial surface, an outer radial surface and an edge;
the inner radial surface of the second extension has a third diameter;
the outer radial surface of the second extension has a fourth diameter;
the third diameter is greater than the second diameter;
the fourth diameter is greater than the third diameter;
the first extension and the second extension are coaxial;
the groove in the centering ring is bounded by the outer radial surface of the first extension and the inner radial surface of the second extension;
the centering ring comprises one of: an element manufactured as a single part, and a compound structure comprising at least two parts; and
said method further comprises at least partially covering the valve body with the cap member.

* * * * *

UNITED STATES PATENT AND TRADEMARK OFFICE
CERTIFICATE OF CORRECTION

PATENT NO. : 5,335,757
DATED : August 9, 1994
INVENTOR(S) : Heinz KNECHT and Hubert BECK It is certified that error appears in the above-indentified patent and that said Letters Patent is hereby corrected as shown below:

In column 3, line 50, after 'first' delete "cheer" and insert --chamber--.
In column 16, line 22, delete "cheers" and insert --chambers--.
In column 16, line 61, after 'to' delete "Dayoust" and insert --Davoust--.
In column 17, line 29, Claim 1, after 'fluid' delete "bbe-" and insert -- be- --.
In column 18, line 49, Claim 2, after 'first' delete "e tension" and insert --extension--.
In column 18, line 63, Claim 2, after 'second' delete "e tension" and insert --extension--.
In column 19, line 11, Claim 2, after 'covers' delete "aid" and insert --said--.
In column 21, line 48, Claim 4, after "cap" insert --member--.

Signed and Sealed this

Twenty-eight Day of February, 1995

Attest:

BRUCE LEHMAN

Attesting Officer     Commissioner of Patents and Trademarks